US012739535B2

(12) United States Patent
Kim et al.

(10) Patent No.: US 12,739,535 B2
(45) Date of Patent: Sep. 15, 2026

(54) IMAGE SENSOR

(71) Applicant: Samsung Electronics Co., Ltd., Suwon-si (KR)

(72) Inventors: Sangwoo Kim, Suwon-si (KR); Kyunghoon Kim, Suwon-si (KR); Chanmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 18/884,589

(22) Filed: Sep. 13, 2024

(65) Prior Publication Data

US 2025/0260912 A1 Aug. 14, 2025

(30) Foreign Application Priority Data

Feb. 14, 2024 (KR) ........................ 10-2024-0021057

(51) Int. Cl.

| | |
|---|---|
| ***H04N 25/78*** | (2023.01) |
| ***H03M 1/56*** | (2006.01) |
| ***H04N 25/76*** | (2023.01) |
| ***H04N 25/771*** | (2023.01) |
| ***H04N 25/772*** | (2023.01) |

(52) U.S. Cl.

CPC ........... *H04N 25/78* (2023.01); *H04N 25/772* (2023.01); *H04N 25/7795* (2023.01)

(58) Field of Classification Search

CPC .. H04N 25/78; H04N 25/772; H04N 25/7795; H04N 25/766; H04N 25/771; H03M 1/56; H03M 1/825; H03M 1/38; H03M 1/12

See application file for complete search history.

(56) References Cited

U.S. PATENT DOCUMENTS

| | | | | |
|---|---|---|---|---|
| 8,946,613 | B2 | 2/2015 | Yin et al. | |
| 9,331,683 | B2 | 5/2016 | Yoo | |
| 9,521,344 | B2 | 12/2016 | Lee et al. | |
| 10,574,919 | B2 | 2/2020 | Kim | |
| 11,350,056 | B2 | 5/2022 | Tomita et al. | |
| 2009/0174442 | A1 * | 7/2009 | Kim | H04N 25/709 327/134 |
| 2014/0036124 | A1 * | 2/2014 | Higuchi | H04N 25/78 348/302 |
| 2014/0124648 | A1 | 5/2014 | Yin et al. | |
| 2015/0042859 | A1 | 2/2015 | Lee et al. | |
| 2015/0263714 | A1 | 9/2015 | Yoo | |
| 2019/0098245 | A1 * | 3/2019 | Kim | H03M 1/38 |
| 2022/0094871 | A1 | 3/2022 | Tomita et al. | |
| 2023/0116433 | A1 | 4/2023 | Simolon | |
| 2024/0323570 | A1 * | 9/2024 | Oh | H04N 25/7795 |

FOREIGN PATENT DOCUMENTS

| | | |
|---|---|---|
| CN | 113365009 A | 9/2021 |
| CN | 115052118 A | 9/2022 |

* cited by examiner

*Primary Examiner* — Marly S Camargo

(74) *Attorney, Agent, or Firm* — Fish & Richardson P.C.

(57) ABSTRACT

An analog-to-digital converter circuit according to some example embodiments includes a ramp signal generator configured to generate a first ramp signal which rises with a first inclination and a second ramp signal which falls with a second inclination, and a comparison circuit configured to output a comparison result between the synthesis signal of a pixel signal output from a pixel array and the first ramp signal and the second ramp signal.

20 Claims, 14 Drawing Sheets

IMAGE SENSOR

CROSS-REFERENCE TO RELATED APPLICATION

This application claims priority to and the benefit of Korean Patent Application No. 10-2024-0021057 filed in the Korean Intellectual Property Office on Feb. 14, 2024, the entire contents of which are incorporated herein by reference.

BACKGROUND

(a) Field

The present disclosure relates to an image sensor.

(b) Description of Related Art

Image sensors are devices for capturing two-dimensional or three-dimensional images of objects. Image sensors generate images of objects, using photovoltaic devices that react according to the intensity of light reflected from the objects.

Recently, with the development of complementary metal-oxide semiconductor (CMOS) technology, CMOS image sensors using CMOSs have been widely used. CMOS image sensors include pixels consisting of CMOS transistors, and convert light energy into electrical signals using photovoltaic devices included in the pixels. An analog-to-digital converter (ADC) receives analog input voltages generated in the pixels and converts the analog input voltages into digital signals. ADCs may include a plurality of comparators, each of which compares the analog input voltages with ramp signals, which have constant slopes and rise or fall. The ramp signals may be generated by a plurality of ramp signal generators.

SUMMARY OF THE INVENTION

The present disclosure attempts to provide an image sensor capable of operating an ADC at a lower voltage.

Also, the present disclosure attempts to provide an image sensor capable of generating a signal with reduced noise.

An analog-to-digital converter circuit according to some example embodiments for achieving the technical object includes a ramp signal generator configured to generate a first ramp signal configured to rise with a first inclination and a second ramp signal configured to fall with a second inclination, and a comparison circuit configured to output a comparison result based on a comparison between a synthesis signal of a pixel signal output from a pixel array, the first ramp signal, and the second ramp signal.

An image sensor according to some example embodiments includes a pixel array including a plurality of pixels, the pixel array configured to output a pixel signal, a ramp signal generator configured to generate a first ramp signal configured to rise with a first inclination and a second ramp signal configured to fall with a second inclination, and an analog-to-digital conversion (ADC) circuit configured to output a digital signal based on the pixel signal output from the pixel array, the digital signal based on a comparison result between a synthesis signal of the pixel signal, and the first ramp signal, and the second ramp signal.

An operating method of an image sensor according to some example embodiments includes outputting a first ramp signal configured to rise with a first inclination and a second ramp signal configured to fall with a second inclination, converting a pixel signal at a reset level into a first digital signal based on a synthesis signal of a pixel signal at the reset level and the first ramp signal and the second ramp signal, converting the pixel signal at the reset level into a second digital signal based on the synthesis signal of the pixel signal and the first ramp signal and the second ramp signal, and generating image data based on the first digital signal and the second digital signal.

BRIEF DESCRIPTION OF THE DRAWINGS

FIG. 4 is a block diagram illustrating an ADC of an image sensor according to some example embodiments.

FIG. 9 is a block diagram illustrating a case where an ADC of an image sensor according to some example embodiments outputs signals containing noise.

DETAILED DESCRIPTION OF THE EMBODIMENTS

Figure 1:
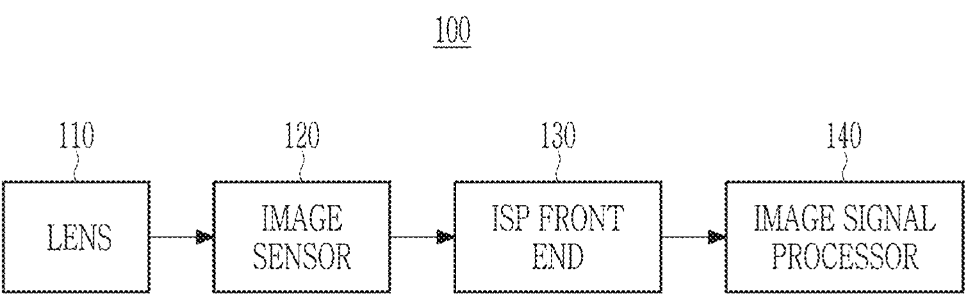
FIG. 1 is a block diagram of an image processing block according to some example embodiments.

In the following detailed description, only some example embodiments of the present disclosure have been shown and described, simply by way of illustration. As those skilled in the art would realize, the described example embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flow charts described with reference to the drawings, the order of operations may be changed, and several operations may be combined, and an operation may be divided, and some operations may not be performed.

Further, expressions written in the singular forms can be comprehended as the singular forms or plural forms unless clear expressions such as “a”, “an”, or “single” are used. Terms including an ordinal number, such as first and second, are used for describing various constituent elements, but the constituent elements are not limited by the terms. These terms are used only to discriminate one constituent element from other constituent elements.

FIG. 1 is a block diagram of an image processing block according to some example embodiments.

Referring to FIG. 1, an image processing block 100 may be implemented as a part of a variety of electronic devices such as cameras, smart phones, wearable devices, Internet of Things (IoT), tablet personal computers (PCs), personal digital assistants (PDAs), portable multimedia players (PMPs), navigation devices, and/or the like. Also, the image processing block 100 may be mounted in (and/or on) an electronic device which may be incorporated as a component in, e.g., vehicles, furniture, manufacturing equipment, doors, various measuring devices, etc.

The image processing block 100 may include a lens 110, an image sensor 120, an image signal processor (ISP) front end 130, and an image signal processor 140.

Light may be reflected by an object, a landscape, and/or the like which is the subject of imaging, and the lens 110 may receive the reflected light. The lens 110 is configured to direct (or focus) the light towards the image sensor 120. The image sensor 120 is configured to generate an electrical signal based on the light received through the lens 110. For example, the image sensor 120 may be implemented as a complementary metal oxide semiconductor (CMOS) image sensor and/or the like. In some embodiments, the image sensor 120 may be a multi pixel image sensor having, e.g., a dual pixel structure or a tetra cell structure.

The image sensor 120 may include a pixel array. The pixels in the pixel array may convert light into electrical signals to generate pixel values. Further, the image sensor 120 may include an analog-to-digital converter (ADC) configured to perform correlation double sampling (CDS) on the pixel values. The configuration of the image sensor 120 will be described in more detail with reference to FIG. 2.

The ISP front end 130 is configured to perform preprocessing on the electrical signals output from the image sensor 120 to process (or convert) the electrical signals output from the image sensor 120 into a form suitable for the image signal processor 140 to process.

The image signal processor 140 is configured to appropriately process the electrical signals processed by the ISP front end 130 to generate image data related to the subject of the imaging (e.g., the object, the landscape, and/or the like included in the image). To this end, the image signal processor 140 may perform various processes such as color correction, auto white balance, gamma correction, color saturation correction, bad pixel correction, hue correction, compression, etc.

FIG. 1 shows one lens 110 and one image sensor 120. However, in other embodiments, the image processing block 100 may include a plurality of lenses, a plurality of image sensors, and a plurality of ISP front end blocks. In this case, the plurality of lenses may have different angles of view, respectively. Further, the plurality of image sensors may have different functions, different performance, and/or different characteristics, and may include pixel arrays having different configurations.

Figure 2:
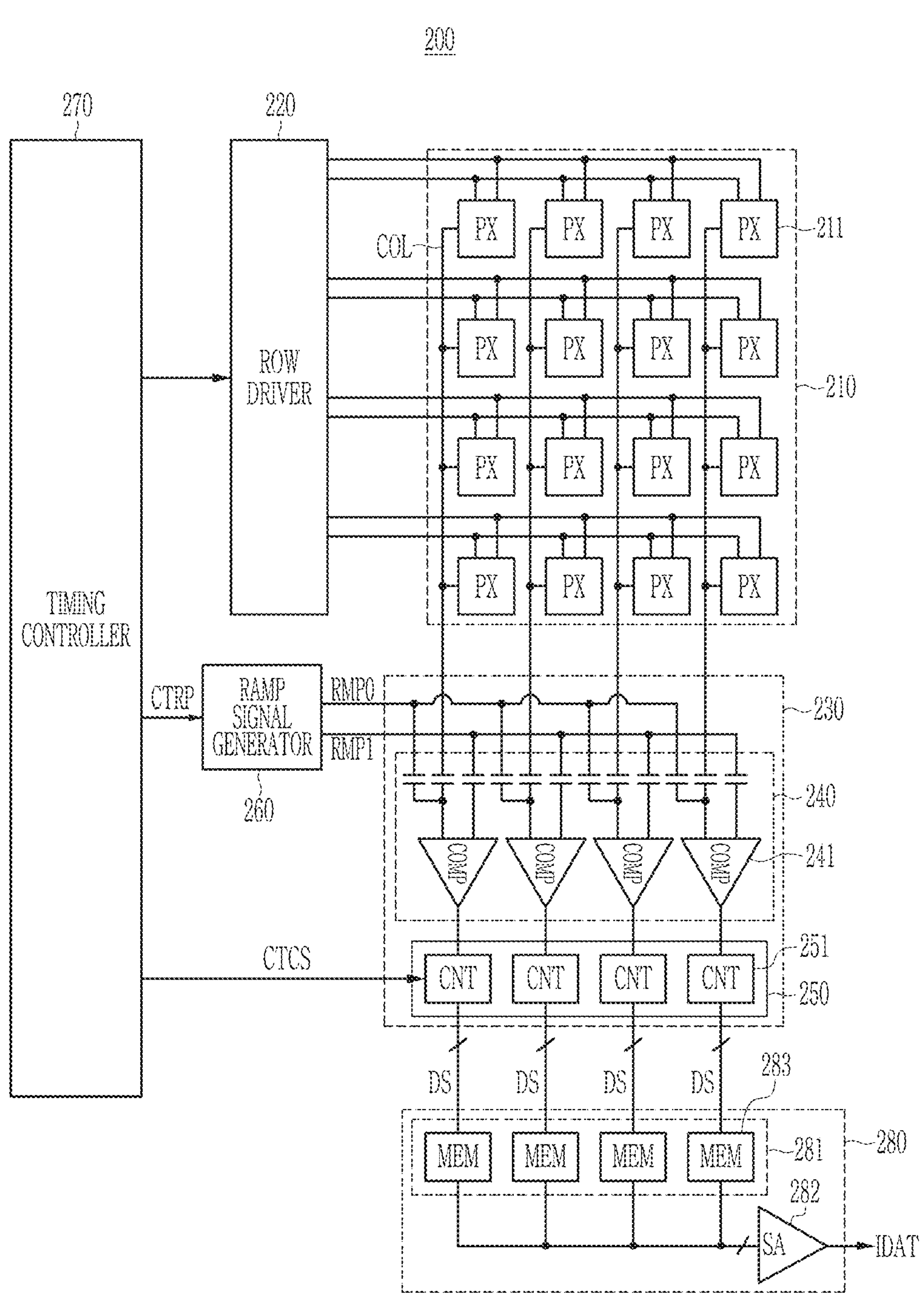
FIG. 2 is a block diagram of an image sensor according to some example embodiments.

FIG. 2 is a block diagram of an image sensor according to some example embodiments.

Referring to FIG. 2, an image sensor 200 may include a pixel array 210, a row driver 220, an ADC 230, a ramp signal generator 260, a timing controller 270, and a buffer circuit 280.

The pixel array 210 may include a plurality of pixels 211, which is connected to a plurality of row lines and a plurality of column lines COL, respectively, and is arranged in a matrix. Each of the plurality of pixels 211 may include at least one light sensing element. For example, the light sensing elements may include photodiodes, phototransistors, photogates, pinned photodiodes, and/or the like. In some embodiments, each of the plurality of pixels 211 may include a plurality of light sensing elements. In some embodiments, the plurality of light sensing elements may be stacked.

The plurality of pixels 211 may detect light using the light sensing elements and convert the light into pixel signals which are electrical signals. Each of the plurality of pixels 211 may detect light in a specific spectrum region. For example, the plurality of pixels 211 may include red pixels configured to convert light in the red spectrum region into electrical signals, green pixels configured to convert light in the green spectrum region into electrical signals, and blue pixels configured to convert light in the blue spectrum region into electrical signals. On each of the plurality of pixels 211, a color filter may be disposed to transmit light in a specific spectrum region. The pixel signals may include a reset signal generated by a reset operation of each of the plurality of pixels 211, and an image signal according to a light sensing operation of each of the plurality of pixels 211.

The timing controller 270 is configured to control the operations and/or timings of the row driver 220, the ADC 230, and the ramp signal generator 260. For example, the timing controller 270 may be configured to output a control signal or a clock signal to each of the row driver 220, the ADC 230, and the ramp signal generator 260 to control the operations and/or timings of the row driver 220, the ADC 230, and the ramp signal generator 260.

The row driver 220 is configured to drive the pixel array 210. In some embodiments, the row driver 220 may be configured to drive the pixel array 210 on a row-by-row basis. For example, the row driver 220 may decode a row control signal (for example, an address signal) generated by the timing controller 270, and select at least one row line from the row lines constituting the pixel array 210 in response to the decoded row control signal. For example, the row driver 220 may generate a row selection signal. The pixel array 210 may output pixel signals from the row selected by the row selection signal provided from the row driver 220.

The ADC 230 may convert the pixel signals input from the pixel array 210 (which are analog signals) into digital signals. The ADC 230 may include a comparison circuit 240 and a counter circuit 250.

The comparison circuit 240 is configured to compare the synthesis signals of a ramp signal RMP0 and a pixel signal. For example, the comparison circuit 240 may compare the synthesis signals of a ramp signal RMP0 and the pixel signals output from unit pixels connected to one column line of the column lines COL with a ramp signal RMP1. The comparison circuit 240 may include a plurality of comparison circuits 241, and each of the plurality of comparison circuits 241 may be connected to at least one corresponding column line of the plurality of column lines COL. Each of the plurality of comparison circuits 241 may be connected to the ramp signal generator 260.

The plurality of comparison circuits 241 is configured to receive the synthesis signals of the pixel signals and the ramp signal RMP0, to compare the synthesis signals of the pixel signals and the ramp signal RMP0 with the ramp signal RMP1, and to output the comparison result signals.

In some embodiments, the plurality of comparison circuits 241 may receive the synthesis signals of the pixel signals and the ramp signal RMP0 having a ramp waveform (inclination waveform) and the ramp signal RMP1 having a ramp waveform. The plurality of comparison circuits 241 may receive the ramp signals RMP0 and RMP1 through buffers (not shown in the drawing). The signs of the inclination of the ramp signal RMP0 and the inclination of the ramp signal RMP1 may be different from each other. The magnitudes of the inclination of the ramp signal RMP0 and the inclination of the ramp signal RMP1 may be substantially the same as each other. The plurality of comparison circuits 241 may compare the ramp signals RMP0 and RMP1 transmitted through the buffers with each other. Each of the plurality of comparison circuit 241 may output a signal with noise, which might have been generated in the buffers, cancelled out by each other.

In some embodiments, the plurality of comparison circuits 241 may receive the synthesis signals of the pixel signals and the ramp signal RMP0 having the ramp waveform and a reference voltage having a constant level. Each of the plurality of comparison circuits 241 may compare the ramp signal RMP0 transmitted through the buffer and the reference voltage with each other.

The plurality of comparison circuits 241 may generate the comparison result signals by applying a correlation double sampling technique, and may be referred to as correlation double sampling circuits. The pixel signals which are output from the plurality of pixels 211 may have deviations due to characteristics (for example, fixed pattern noise (FPN) and/or the like) inherent to the individual pixels and/or deviations due to differences in the characteristics of the components outputting the pixel signals from the pixels 211. Obtaining reset components (or reset signals) and image components (or image signals) from the pixel signals and extracting the differences between them as valid signal components in order to compensate for the deviations between the pixel signals may be referred to as correlation double sampling. The plurality of comparison circuits 241 may output the comparison result signals by applying the correlation double sampling technique.

The ADC 230 may operate based on illuminance. More specifically, the analog gain of the ADC 230 (more specifically, the analog gain of a ramp generator which is included in the ADC 230) may be changed on the basis of illuminance. Accordingly, the ADC 230 may operate based on an analog gain value which differs depending on illuminance. For example, when the image sensor 200 is exposed to a higher-illuminance environment (for example, sunlight and/or the like), the ADC 230 may operate based on a lower analog gain value. In contrast, when the image sensor 200 operates in a lower-illuminance environment (for example, at night and/or in a darkroom), the ADC 230 may operate based on a higher analog gain value.

In some embodiments, when the analog gain of the ADC 230 is a first value (for example, '1'), the comparison circuits 241 may receive the synthesis signals of the pixel signals and the ramp signal RMP0 and the ramp signal RMP1. When the image sensor 200 operates in a first mode and the analog gain of the ADC 230 is a second value higher than the first value (for example, '2' to '16'), the comparison circuits 241 may receive the synthesis signals of the pixel signals and the ramp signal RMP0 and the ramp signal RMP1. Thereby, the image sensor 200 may be configured to switch between the first and second modes; and to operate in the first mode for canceling out noise which may be generated in the buffers and/or in the second mode having reduced power consumption. For example, when the image sensor 200 operates in a second mode and the analog gain of the ADC 230 is the second value, the comparison circuits 241 may receive the synthesis signals of the pixel signals and the ramp signal RMP0 and the reference voltage having the constant level. Therefore, in the second mode of the image sensor 200 (in which the image sensor operates at lower power) the image sensor 200 may turn off the buffers configured to transmit the ramp signal RMP1. In the second mode of the image sensor 200, since the buffers are turned off, the power consumption of the ADC 230 may be reduced.

The ramp signal generator 260 may generate the ramp signals RMP0 and RMP1. For example, the ramp signal generator 260 may generate the ramp signal RMP0 that increases with a constant inclination and the ramp signal RMP1 which decreases with a constant inclination. The ramp signal generator 260 may operate based on a ramp control signal CTRP which is provided from the timing controller 270. The ramp control signal CTRP may include a ramp enable signal, a mode signal, etc. When the ramp enable signal is activated, the ramp signal generator 260 may generate the ramp signals RMP0 and RMP1 based on the mode signal. For example, in one mode (e.g., a first mode of the ramp signal generator 260), the ramp signal generator 260 may generate the ramp signal RMP0 that increases with a first inclination and the ramp signal RMP1 that decreases with a first inclination. In another mode (e.g., a second mode of the ramp signal generator 260), the ramp signal generator 260 may generate the ramp signal RMP0 that increases with a second inclination different from the first inclination and the ramp signal RMP1 that decreases with a second inclination. As indicated in further detail below, both the first and second modes of the image sensor 200 may include the first and second modes of the ramp signal generator 260.

The counter circuit 250 may include a plurality of counters 251. The plurality of counters 251 may be connected to the output terminals of the comparison circuits 241, respectively, and be configured to count the output signals of the individual comparison circuits 241. A counter control signal CTCS may include a counter clock signal, a counter reset signal for controlling the reset operations of the plurality of counters 251, an inversion signal for inverting the internal bit of each of the plurality of counters 251, etc. The counter circuit 250 may count the comparison result signals on the basis of the counter clock signal, and output the counting results as digital signals DS.

The counters 251 may include up/down counters, bit-wise inversion counters, etc. In this case, the bit-wise inversion counters may perform an operation the same as and/or similar to that of the up/down counters. For example, the bit-wise inversion counters may perform a function of performing only up count, and a function of inverting all bits in the counters to make l's complements (or 2's complements) when a specific signal is input. The bit-wise inversion counters may perform reset count and then convert the bits into l's complements (e.g., n invert the bits), thereby converting the bits into negative values.

However, the image sensor 200 according to the present disclosure is not limited thereto. The image sensor 200 may further include a counting code generator configured to generate a counting code under the control of the timing controller 270. The counting code generator may be implemented as a gray code generator, and may generate a plurality of code values having a resolution according to a set number of bits, as counting codes. For example, the plurality of counters 251 may include latch circuits and operation circuits, and the latch circuits may be configured to receive the counting codes from the counting code generator and the output signals from the comparison circuit 240, and to latch the code values of the counting codes at the time when the level of a comparison signal transitions. The operation circuits may be configured to calculate the reset values and the image signal values to generate the image signal values of the pixels 211 from which the reset levels have been removed. The counter circuit 250 may output the image signal values from which the reset levels have been removed, as pixel values.

The buffer circuit 280 may be configured to temporarily store the digital signals output from the ADC 230, to amplify the digital signals, and to output the digital signals. The buffer circuit 280 may include a column memory block 281 and a sense amplifier 282, and the column memory block 281 may include a plurality of memories 283. The plurality of memories 283 may temporarily store the digital signals output from the plurality of counters 251, respectively, and then output them to the sense amplifier 282, and the sense amplifier 282 may sense the digital signals output from the plurality of memories 283 and amplify them. The sense amplifier 282 may output the amplified digital signals as image data IDAT.

In some example embodiments, the image sensor 200 may include an illuminance sensor (not shown in the drawing). In this case, the ADC 230 may adjust the analog gain value based on illuminance data received from the illuminance sensor. However, the embodiment of the present disclosure is not limited thereto, and the ADC 230 may adjust the analog gain value on the basis of illuminance data measured by an illuminance sensor (not shown in the drawing) provided outside the image sensor 200.

Figure 3:
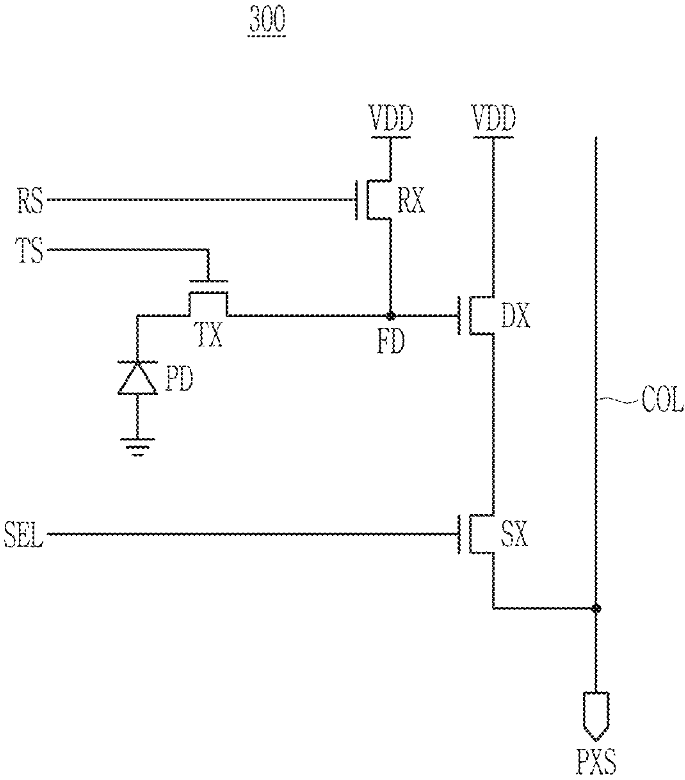
FIG. 3 is a circuit diagram illustrating a pixel of an image sensor according to some example embodiments.

FIG. 3 is a circuit diagram illustrating a pixel of an image sensor according to some example embodiments.

Referring to FIG. 3, a pixel 300 may include a photodiode PD, a transfer transistor TX, a floating diffusion node FD, a reset transistor RX, a drive transistor DX, and a selection transistor SX. However, the examples are not limited thereto, and the photodiode PD may be replaced by other photovoltaic devices.

The photodiode PD may generate an optical charge which varies depending on the intensity of incident light. The transfer transistor TX may transfer the optical charge to the floating diffusion node FD in response to a transfer control signal TS which is output from the row driver (reference symbol "220" in FIG. 2). The drive transistor DX may amplify the optical charge and transmit the optical charge to the selection transistor SX, based on the potential according to the optical charge accumulated in the floating diffusion node FD. The selection transistor SX may have a drain connected to the source of the drive transistor DX, and output a pixel signal PXS to a column line COL connected to the pixel 300, based on a selection signal SEL which is output from the row driver 220. The reset transistor RX may reset the floating diffusion node FD to the level of a power voltage VDD in response to a reset control signal RS which is provided from the row driver 220.

In FIG. 3, it is shown that the pixel 300 has one photodiode PD and a 4-transistor (4T) structure including four transistors TX, RX, DX, and SX; however, each of a plurality of pixels 300 which is included in an image sensor according to the present disclosure is not limited to the structure of FIG. 3. A pixel 300 may be a pixel having a 3-transistor (3T) structure, and may include a photodiode PD, and may include three transistors selected from a transfer transistor TX, a reset transistor RX, a drive transistor DX, and a selection transistor SX. In some embodiments, a pixel 300 may include a plurality of photodiodes PD and transfer transistors TX connected to the plurality of photodiodes PD. Also, a pixel 300 may include a plurality of floating diffusion nodes FD.

Figure 4:
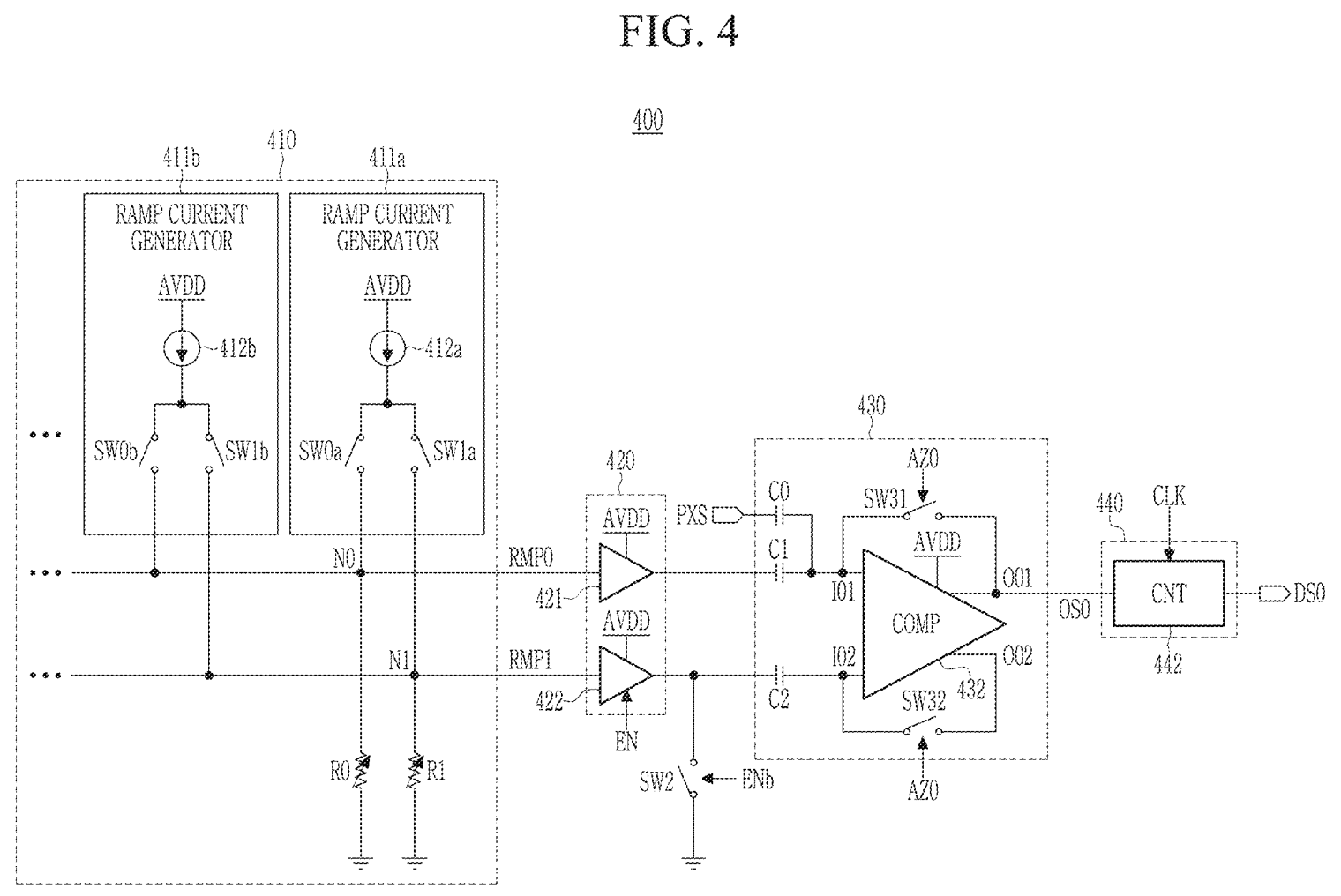

FIG. 4 is a block diagram illustrating an ADC of an image sensor according to some example embodiments.

Referring to FIG. 4, an ADC 400 may include a ramp signal generator 410, a buffer circuit 420, a comparison circuit 430, and a counter circuit 440. The output terminals of the ramp signal generator 410 are connected to the input terminals of the buffer circuit 420, and the output terminals of the buffer circuit 420 may be connected to the input terminals of the comparison circuit 430. The output terminal of the comparison circuit 430 may be connected to the input terminal of the counter circuit 440.

In some example embodiments, the ramp signal generator 410 may include a plurality of ramp current generators 411*a*, 411*b*, etc., and a plurality of ramp resistors R0 and R1. The plurality of ramp current generators 411*a*, 411*b*, etc., may be connected in parallel with one another at each of the nodes N0 and N1. The plurality of ramp current generators 411*a*, 411*b*, etc., may include ramp current sources 412*a*, 412*b*, etc., and a plurality of switches SW0*a*, SW1*a*, SW0*b*, SW1*b*, etc. For example, the ramp current sources 412*a*, 412*b*, etc., may be connected to the node N0 through the switches SW0*a*, SW0*b*, etc. The ramp current sources 412*a*, 412*b*, etc., may be connected to the node N1 through the switches SW1*a*, SW1*b*, etc.

The switches SW0*a*, SW1*a*, SW0*b*, SW1*b*, etc., may be controlled by the ramp control signal CTRP. As the number of ramp current sources 412*a*, 412*b*, etc., which are connected to the node N0 by the ramp control signal CTRP increases, current flowing in the ramp resistor R0 may increase. As the number of ramp current sources 412*a*, 412*b*, etc., which are connected to the node N1 by the ramp control signal CTRP increases, current flowing in the ramp resistor R1 may increase.

When it is required to raise the ramp signal RMP0 at a constant inclination, the switches SW0*a*, SW0*b*, etc., may be sequentially closed, and the ramp current sources 412*a*, 412*b*, etc., may be sequentially connected to the node N0 through the closed switches SW0*a*, SW0*b*, etc. When all ramp current sources 412*a*, 412*b*, etc., are connected to the node NO, the ramp signal RMP0 may have the highest voltage level.

When it is required to lower the ramp signal RMP1 at a constant inclination, the switches SW1*a*, SW1*b*, etc., connected to the node N1 may be sequentially opened in a state where all switches SW1*a*, SW1*b*, etc., are closed. When the plurality of ramp current sources 412*a*, 412*b*, etc., is not connected to the node N1, the ramp signal RMP0 may have the lowest voltage level.

In some embodiments, the switches SW0*a*, SW0*b*, etc., and the switches SW1*a*, SW1*b*, etc., may operate complementarily. For example, when one of open switches SW0*a*, SW0*b*, etc., is closed, one of closed switches SW0*a*, SW0*b*, etc., may be opened. In other words, by the switches SW0*a*, SW1*a*, SW0*b*, SW1*b*, etc., operating complementarily, the ramp signal RMP0 may rise (or fall) and the ramp signal RMP1 may fall (or rise).

In some embodiments, the plurality of ramp current sources 412*a*, 412*b*, etc., may be sequentially turned on or turned off by the ramp control signal CTRP. The ramp signals RMP0 and RMP1 may be raised or lowered by the plurality of ramp current sources 412*a*, 412*b*, etc., which is sequentially turned on or turned off. When the plurality of ramp current sources 412*a*, 412*b*, etc., is controlled by the ramp control signal CTRP, the switches SW0*a*, SW1*a*, SW0*b*, SW1*b*, etc., which connect the plurality of ramp current sources 412*a*, 412*b*, etc., and the nodes N0 and N1 may all be closed.

The plurality of ramp resistors R0 and R1 may be variable resistors. Thus, the timing controller 270 may adjust the analog gains of the ramp signals RMP0 and RMP1 by changing the resistance values of the plurality of ramp resistors R0 and R1 by the ramp control signal CTRP. For example, the larger the values of the plurality of ramp resistors R0 and R1, the greater the amounts of change in the ramp signals RMP0 and RMP1 which vary as the plurality of ramp current generators 411*a*, 411*b*, etc., are connected to and/or disconnected from the nodes N0 and N1. When the analog gain values are large, the plurality of ramp resistors R0 and R1 may be set to have small resistance values. When the analog gain values are small, the plurality of ramp resistors R0 and R1 may be set to have large resistance values. Alternatively, the resistance values of the plurality of ramp resistors R0 and R1 may be determined based on the illuminance of the environment in which the image sensor 200 operates. For example, when the image sensor 200 operates in a higher-illuminance environment (e.g., a bright environment), the plurality of ramp resistors R0 and R1 may have large resistance values. When the image sensor 200 operates in a lower-illuminance environment (e.g., a dark environment), the plurality of ramp resistors R0 and R1 may have small resistance values.

The buffer circuit 420 may be configured to buffer the ramp signals RMP0 and RMP1 and provide the buffered ramp signals RMP0 and RMP1 to the comparison circuit 430. The buffer circuit 420 may include a plurality of buffers 421 and 422. The plurality of buffers 421 and 422 may receive a driving voltage AVDD. The buffer 421 may buffer the ramp signal RMP0 and provide it to the comparison circuit 430. The buffer 422 may buffer the ramp signal RMP1 and provide it to the comparison circuit 430. The buffer 422 may be turned on or turned off on the basis of an enable signal EN. Between the output terminal of the buffer 422 and the reference voltage (shown as a ground voltage in FIG. 4), a switch SW2 may be connected. The switch SW2 may be closed or opened based on an enable signal Enb. For example, the switch SW2, when turned on, may provide the reference voltage to one electrode of a capacitor C2. In some embodiments, the buffer 422 and the switch SW2 may operate complementarily. For example, as shown in FIG. 4, the buffer 422 may be turned on, on the basis of the enable signal EN, and the switch SW2 may be opened on the basis of the enable signal Enb. Then, the buffer 422 may provide the ramp signal RMP1 to one electrode of the capacitor C2.

The comparison circuit 430 may include a comparator 432, capacitors C0, C1, and C2, and switches SW31 and SW32. The comparator 432 may include a differential amplifier, and the differential amplifier may be implemented as an operational transconductance amplifier (OTA), an operational amplifier, and/or the like.

A first input terminal IO1 of the comparator 432 may receive a pixel signal PXS through the capacitor C0 and receive the ramp signal RMP0 through the capacitor C1. A second input terminal IO2 of the comparator 432 may receive the ramp signal RMP1 through the capacitor C2. The comparator 432 may compare the two signals (the synthesis signal of the pixel signal PXS and the ramp signal RMP0 and the ramp signal RMP1), received through the first input terminal IO1 and the second input terminal IO2, with each other, and output the comparison result as an output signal OS0 through a first output terminal O01. The first output terminal O01 and the first input terminal IO1 may be connected through the switch SW31, and a second output terminal O02 and the first input terminal IO1 may be connected through the switch SW32. Although it is shown that the pixel signal PXS which is provided from one column line is applied to the capacitor C0, a plurality of pixel signals PXS which is provided from a plurality of column lines may be applied to the capacitor C0.

The comparator 432 may be initialized in response to an auto-zero signal AZO before a comparison operation is performed. In some embodiments, the comparator 432 may be initialized in response to the auto-zero signal AZO at an enable level. For example, when the auto-zero signal AZO at the enable level is applied to the switch SW31, an input node IO1 and an output node O01 of the comparator 432 may be connected such that the voltage levels of the two nodes are equalized.

The counter circuit 440 may include a counter 442 connected to the first output terminal O01 of the comparator 432. The counter 442 may count the comparison result signal, (e.g., the output signal OS0 of the comparator 432) based on the counting clock signal CLK, and output a digital signal DS0. The counter circuit 440 may transmit the digital signal DS0 to the buffer circuit (reference symbol '280' in FIG. 2).

The ADC 400 according to the embodiment may compare the synthesis signal of the ramp signal RMP0 and the pixel signal PXS and the ramp signal RMP1 with each other. Accordingly, the magnitudes of the inclinations of the ramp signals RMP0 and RMP1 may be smaller as compared to the related art in which the ADC 400 compares the pixel signal PXS and one ramp signal having the same gain with each other. For example, the unit current of a plurality of ramp current sources 412*a*, 412*b*, etc., which outputs a conventional ramp signal RMP1 with a swing range having a first magnitude VFS may be expressed as the following Equation 1.

$$I1 = \frac{VFS}{N \times R1} \quad \text{(Equation 1)}$$

Here, I1 may represent the current magnitude of each of the plurality of ramp current sources 412*a*, 412*b*, etc., and VFS may represent the swing range of the ramp signal RMP1, and N may represent the number of the plurality of ramp current sources 412*a*, 412*b*, etc., and R1 may represent the resistance value of the resistor R1.

Since the ADC 400 according to some embodiments generates the two ramp signals RMP0 and RMP1 with opposite inclinations, the swing range of each of the two ramp signals RMP0 and RMP1 may be half of the first magnitude VFS. The unit current of the plurality of ramp current sources 412*a*, 412*b*, etc., that output the two ramp signals RMP0 and RMP1 may be expressed as the following Equation 2.

$$I2 = \frac{0.5VFS}{N \times R1} \quad \text{(Equation 2)}$$

Here, I2 may represent the current magnitude of each of the plurality of ramp current sources 412*a*, 412*b*, etc., and VFS may represent the swing range of the ramp signal RMP1, and N may represent the number of the plurality of ramp current sources 412*a*, 412*b*, etc., and R1 may represent the resistance value of the resistor R1.

The driving voltage which the plurality of ramp current sources 412*a*, 412*b*, etc., receives to generate the unit current I2 may be smaller than the driving voltage which the plurality of ramp current sources 412*a*, 412*b*, etc., receives to generate the unit current I1. For example, the driving voltage which the plurality of ramp current sources 412*a*, 412*b*, etc., receives to generate the unit current I1 and the driving voltage which they receive to generate the unit current I2 may be expressed as the following Equation 3.

$$AVDD = \alpha \times VDD \quad \text{(Equation 3)}$$

Here, 0<α<1 may be satisfied, and AVDD may be the driving voltage which the plurality of ramp current sources 412*a*, 412*b*, etc., receives to generate the unit current I2, and VDD may be the driving voltage which the plurality of ramp current sources 412*a*, 412*b*, etc., receives to generate the unit current I1. Accordingly, the plurality of ramp current sources 412*a*, 412*b*, etc., of the ADC 400 and the plurality of buffers 421 and 422 according to the embodiment may operate at the smaller driving voltage AVDD. Then, the power consumption of the conventional ADC 400 and the power consumption of the ADC 400 according to the embodiment may be expressed as the following Equations 4 and 5.

$$P1 = VDD \times I1 \times N \quad \text{(Equation 4)}$$

$$\begin{aligned} P2 &= AVDD \times I2 \times N \quad \text{(Equation 5)} \\ &= \alpha \times VDD \times 0.5 \times I1 \times N \\ &= \alpha \times 0.5 \times P1 \end{aligned}$$

Here, P1 may be the power consumption of the conventional ADC 400 and P2 may be the power consumption of the ADC 400 according to some of the example embodiments. As shown in Equation 5, the power consumption of the ADC 400 according to the example embodiments may be smaller than the power consumption of the conventional ADC 400.

Figure 5:
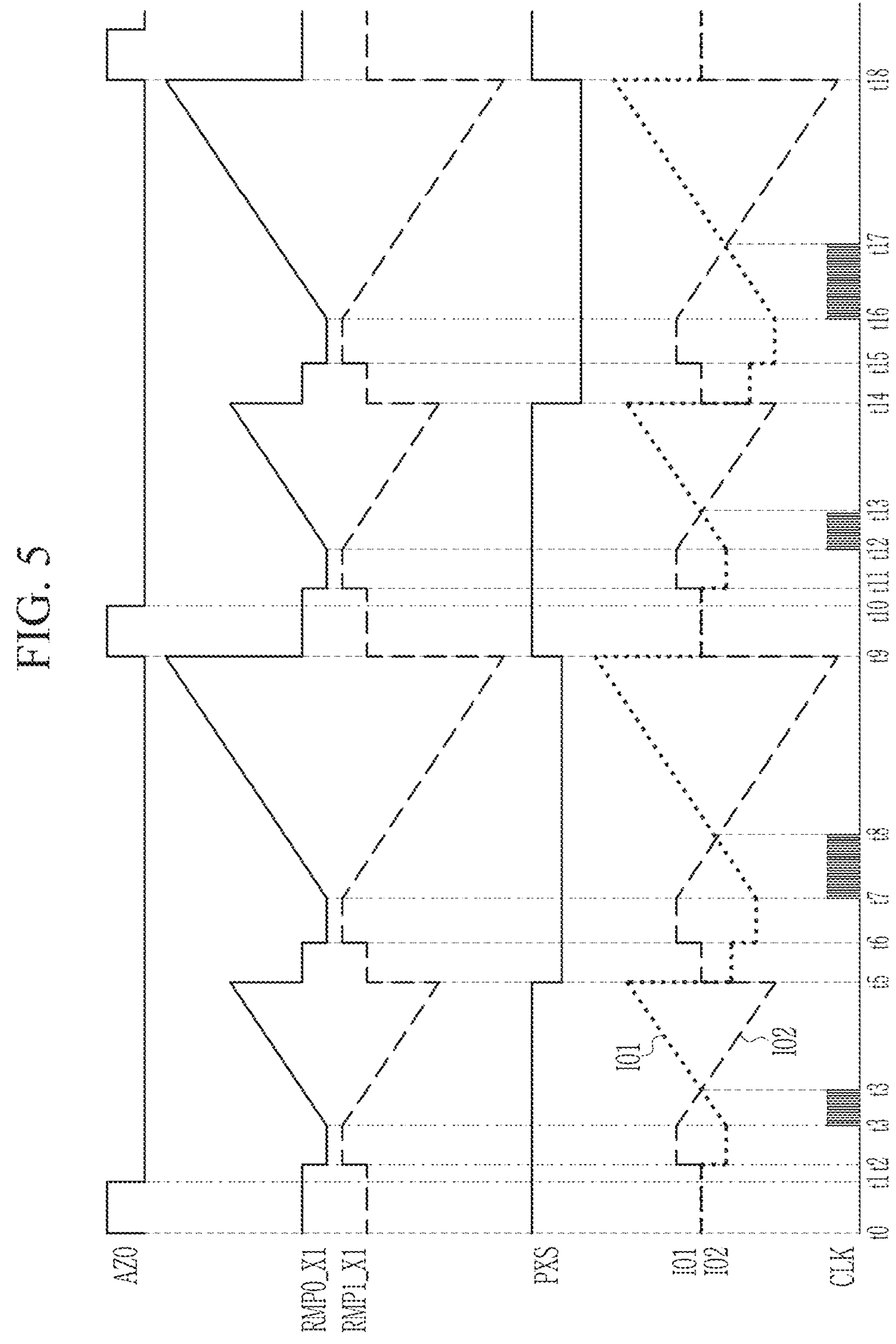
FIG. 5 is a timing chart illustrating signals which are applied to the ADC of the image sensor according to some embodiments.
Figure 6:
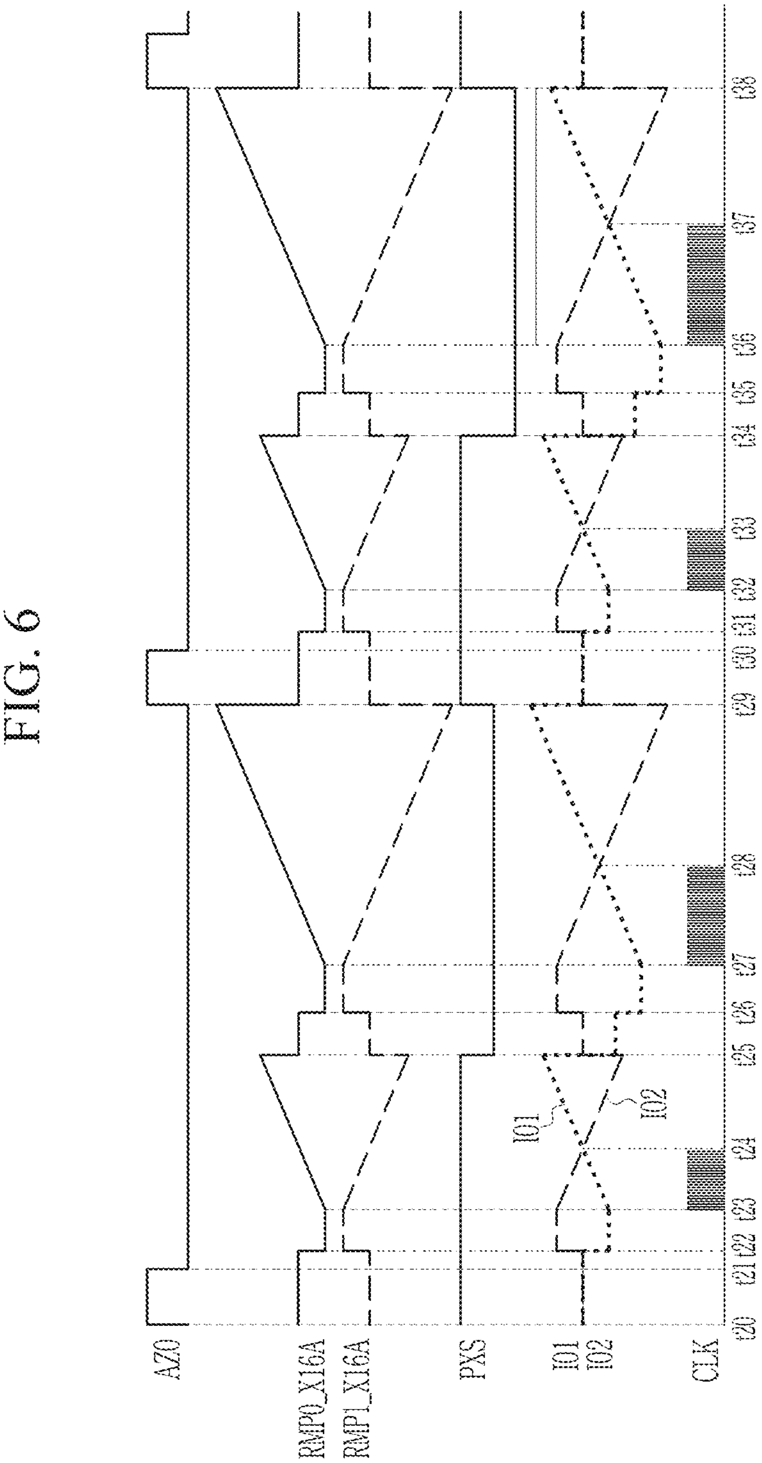
FIG. 6 is a timing chart illustrating signals which are applied to the ADC of the image sensor according to some embodiments.

FIGS. 5 and 6 are timing charts illustrating signals which are applied to the ADC of the image sensor according to some embodiments.

The following description will be made on the assumption that the analog gain of the ADC 400 in FIG. 5 is '1' and the analog gain of the ADC 400 in FIG. 6 is '16'.

Hereinafter, the operation of the ADC 400 will be described with reference to FIG. 4 together with FIG. 5.

Referring to FIGS. 4 and 5, a period from a time point t0 to a time point t1 may be defined as an auto-zero period, and the period from the time point t1 to a time point t8 may be defined as a comparison operation period.

From the time point t0 to the time point t1, the auto-zero signal AZO may be activated and the comparator 432 may be initialized in response to the auto-zero signal AZO. For example, the voltage levels of the input terminals IO1 and IO2 and output terminals O01 and O02 of the comparator 432 may be equalized. Also, at the time point t0, ramp signals RMP0_X1 and RMP1_X1 may be set to predetermined reset levels. Further, the floating diffusion node FD (see FIG. 3) of a pixel 211 is reset, and a pixel signal PXS is set to a reset level.

For digital conversion of the pixel signal PXS at the reset level, an offset may be applied to the ramp signals RMP0_X1 and RMP1_X1 at a time point t2. Through the buffer 421, the ramp signal RMP0_X1 may be transferred to the input terminal IO1 of the comparator 432. To the input terminal IO1, the synthesis signal of the ramp signal RMP0_X1 and the pixel signal PXS may be input. Through the buffer 422, the ramp signal RMP1_X1 may be transferred to the input terminal IO2 of the comparator 432. Since the voltage of the input terminal IO1 is lower than the voltage of the input terminal IO2, the output signal OS0 of the comparator 432 may become a lower level.

From a time point t3 to a time point t5, the ramp signal RMP0_X1 may increase and the ramp signal RMP1_X1 may decrease. The voltage of the input terminal IO1 may be linearly increased by the ramp signal RMP0_XL. The voltage of the input terminal IO2 may be linearly decreased by the ramp signal RMP1_X1. Thereafter, when the voltage of the input terminal IO1 becomes higher than the voltage of the input terminal IO2, the output signal OS0 of the comparator 432 may be inverted to a higher level. The counter 442 may count the counting clock signal CLK from the time point t3 to a time point t4 when the polarity of the output signal OS0 changes. The count value of the counter 442 when the output signal OS0 is Inverted from the lower level to the higher level may be maintained as the value of the pixel signal PXS at the reset level in a memory 283 (see FIG. 2).

When the digital conversion of the pixel signal PXS at the reset level by the comparator 432 is completed, the ramp signals RMP0_X1 and RMP1_X1 may be set as reset voltages at the time point t5. Also, the transfer transistor TX of the pixel 211 may be turned on such that the charge accumulated in the photodiode PD is transferred to the floating diffusion node FD and the pixel signal PXS may be set to a signal level. As a result, the voltage of the input terminal IO1 may be lowered by a value corresponding to the signal level, such that it becomes equal to or lower than the voltage of the input terminal IO2, and the output signal OS0 of the comparator 432 may become the lower level.

At a time point t6, an offset may be applied to the ramp signals RMP0_X1 and RMP1_X1 again. Accordingly, the voltage of the input terminal IO1 may be further lowered by the offset.

From a time point t7 to a time point t9, the ramp signal RMP0_X1 may increase and the ramp signal RMP1_X1 may decrease. The ramp signals RMP0_X1 and RMP1_X1 may increase or decrease linearly as in the period from the time point t3 to the time point t5. The voltage of the input terminal IO1 may be linearly increased by the ramp signal RMP0_X1. The voltage of the input terminal IO2 may be linearly decreased by the ramp signal RMP1_X1. Thereafter, when the voltage of the input terminal IO1 becomes higher than the voltage of the input terminal IO2, the output signal OS0 of the comparator 432 may be inverted to a higher level. The counter 442 may count the counting clock signal CLK from the time point t7 to the time point t8 when the polarity of the output signal OS0 changes. The count value of the counter 442 when the output signal OS0 is inverted from the lower level to the higher level may be maintained as the value of the pixel signal PXS at the signal level in the memory 283.

The memory 283 may perform correlation double sampling (CDS) based on the difference between the pixel signal PXS at the reset level and the pixel signal PXS at the signal level read in the period from the time point t3 to the time point t5. Thereby, the difference between the pixel signal PXS at the reset level and the pixel signal PXS at the signal level may be converted into a digital signal.

After a time point t10, an operation the same as and/or substantially similar to that from the time point t1 to the time point t9 may be repeated.

Referring to FIGS. 4 to 6, an operation of the ADC 400 from a time point t20 to a time point t38 in FIG. 6 may be similar to that from the time point t0 to a time point t18 in FIG. 5.

The inclinations of the ramp signals RMP0_X1 and RMP1_X1 corresponding to the analog gain" " in FIG. 6 may be 16 times the inclinations of ramp signals RMP0_X16A and RMP1_X16A corresponding to the analog gain "1". Since the magnitude of the pixel signal PXS is smaller in a lower-illuminance environment as compared to a higher-illuminance environment, the ramp signals RMP0_X16A and RMP1_X16A with smaller inclinations may be used.

In FIGS. 4 to 6, the comparator 432 may compare the two signals (the synthesis signal of the pixel signal PXS and the ramp signal RMP0 and the ramp signal RMP1), received through the first input terminal IO1 and the second input terminal IO2, with each other, and output the comparison result as an output signal OS0 through a first output terminal O01. According to some example embodiments, noise which might have been generated in the buffers 421 and 422 is differentiated by the comparator 432, an output signal OS0 with noise cancelled out may be output. Noise which may be generated in the buffers 421 and 422 will be described below with reference to FIGS. 9 to 12.

Figure 7:
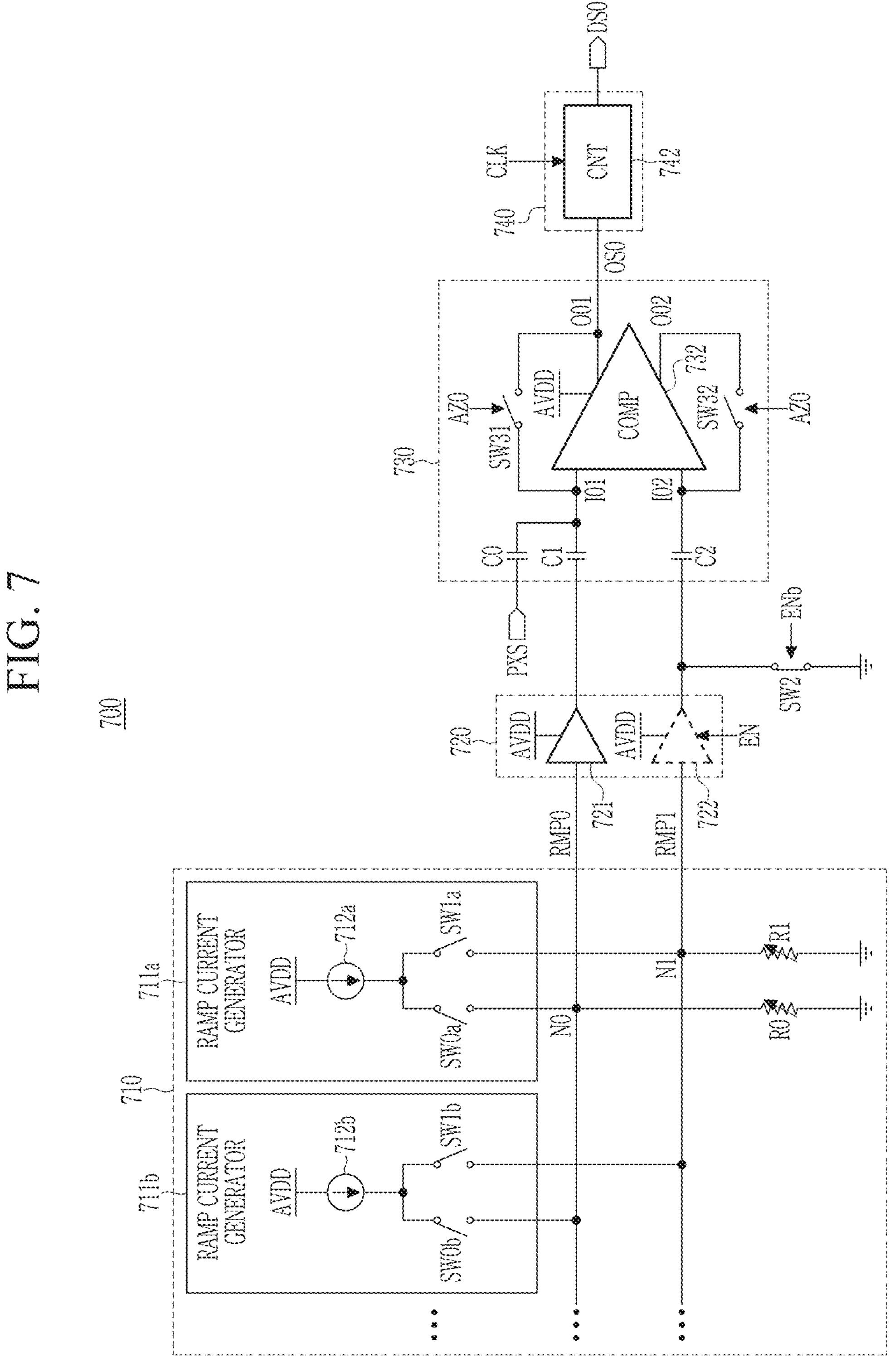
FIG. 7 is a block diagram illustrating an ADC of an image sensor according to some example embodiments.

FIG. 7 is a block diagram illustrating an ADC of an image sensor according to some example embodiments.

Referring to FIG. 7, an ADC 700 may include a ramp signal generator 710, a buffer circuit 720, a comparison circuit 730, and a counter circuit 740. The output terminals of the ramp signal generator 710 are connected to the input terminals of the buffer circuit 720, and the output terminals of the buffer circuit 720 may be connected to the input terminals of the comparison circuit 730. The output terminal of the comparison circuit 730 may be connected to the input terminal of the counter circuit 740. Hereinafter, the description of constituent elements in FIG. 7 may be identical and/or substantially similar to the constituent elements of the ADC 400 in FIG. 4 and therefore the description will not be repeated.

Unlike the buffer 422, the buffer 722 may be configured to be turned off based on an enable signal EN, and a switch SW2 may be closed on the basis of an enable signal eNb. Then, the switch SW2 turned on may provide a reference voltage to one electrode of a capacitor C2.

Figure 8:
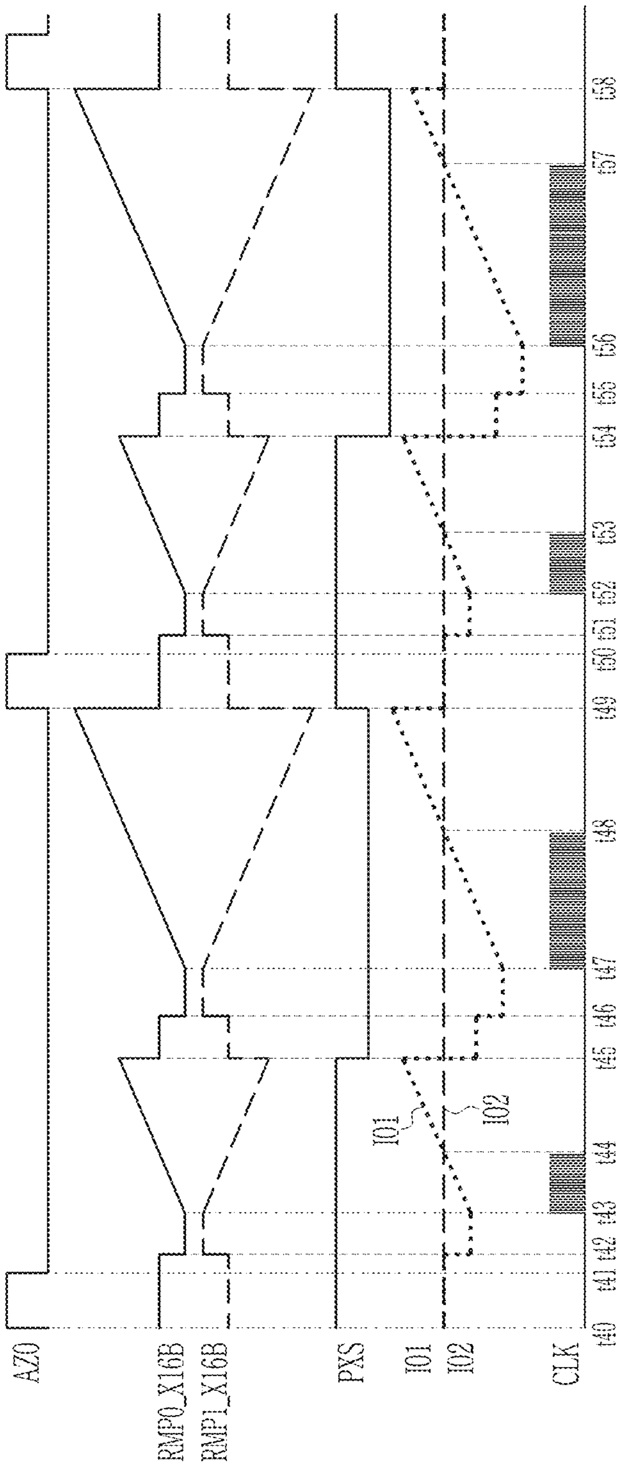
FIG. 8 is a timing chart illustrating signals which are applied to the ADC of the image sensor according to the embodiment.

FIG. 8 is a timing chart illustrating signals which are applied to the ADC of the image sensor according to the embodiment.

The following description will be made on the assumption that the analog gain of the ADC 700 in FIG. 8 is "1". The inclinations of the ramp signals RMP0_X16A and RMP1_X16A in FIG. 6 when the image sensor 200 operates in the first mode and the analog gain of the ADC 400 is "1" and the inclinations of ramp signals RMP0_X16B and RMP1_X16B in FIG. 8 when the image sensor 200 operates in the second mode and the analog gain of the ADC 700 is "1" may be the same as each other.

Hereinafter, the operation of the ADC 700 will be described with reference to FIG. 7 together with FIG. 8.

Referring to FIGS. 7 and 8, the period from a time point t40 to a time point t41 may be defined as an auto-zero period, and the period from the time point t41 to a time point t48 may be defined as a comparison operation period.

From the time point t40 to the time point t41, an auto-zero signal AZO may be activated and a comparator 732 may be initialized in response to the auto-zero signal AZO. Also, at the time point t40, ramp signals RMP0_X16B and RMP1_X16B may be set to predetermined reset levels. Further, the floating diffusion node FD (see FIG. 3) of a pixel 211 is reset, and a pixel signal PXS is set to a reset level.

For digital conversion of the pixel signal PXS at the reset level, an offset may be applied to the ramp signals RMP0_X16B and RMP1_X16B at a time point t42. Through a buffer 721, the ramp signal RMP0_X16B may be transferred to the input terminal IO1 of the comparator 732. Since the buffer 722 is in an off state, the ramp signal RMP1_X16B may not be transferred to the input terminal IO2 of the comparator 732. Through the closed switch SW2, a reference voltage may be transferred to the input terminal IO2 through the capacitor C2.

From a time point t43 to a time point t45, the ramp signal RMP0_X16B may increase and the ramp signal RMP1_X16B may decrease. The voltage of the input terminal IO1 may be linearly increased by the ramp signal RMP0_X16B. The voltage of the input terminal IO2 may be maintained at a constant level by the reference voltage. Thereafter, when the voltage of the input terminal IO1 becomes higher than the voltage of the input terminal IO2, the output signal OS0 of the comparator 732 may be inverted to a higher level. A counter 742 may count the counting clock signal CLK from the time point t43 to a time point t44 when the polarity of the output signal OS0 changes. The count value of the counter 742 when the output signal OS0 is inverted from the lower level to the higher level may be maintained as the value of the pixel signal PXS at the reset level in a memory 283 (see FIG. 2).

The ramp signals RMP0_X16B and RMP1_X16B may be set as reset voltages at the time point t45. Also, the transfer transistor TX of the pixel 211 may be turned on such that the charge accumulated in the photodiode PD is transferred to the floating diffusion node FD and the pixel signal PXS may be set to a signal level.

At a time point t46, an offset may be applied to the ramp signals RMP0_X16B and RMP1_X16B again. Accordingly, the voltage of the input terminal IO1 may be further lowered by the offset.

From a time point t47 to a time point t49, the ramp signal RMP0_X16B may increase and the ramp signal RMP1_X16B may decrease. The ramp signals RMP0_X16B and RMP1_X16B may increase or decrease linearly as in the period from the time point t43 to the time point t45. The voltage of the input terminal IO1 may be linearly increased by the ramp signal RMP0_X16B. The voltage of the input terminal IO2 may be maintained at a constant level by the reference voltage. Thereafter, when the voltage of the input terminal IO1 becomes higher than the voltage of the input terminal IO2, the output signal OS0 of the comparator 732 may be inverted to a higher level. The counter 742 may count the counting clock signal CLK from the time point t47 to the time point t48 when the polarity of the output signal OS0 changes. The count value of the counter 742 when the output signal OS0 is inverted from the lower level to the higher level may be maintained as the value of the pixel signal PXS at the signal level in the memory 283.

The memory 283 may perform CDS based on the difference between the pixel signal PXS at the reset level and the pixel signal PXS at the signal level read in the period from the time point t43 to the time point t45. Thereby, the difference between the pixel signal PXS at the reset level and the pixel signal PXS at the signal level may be converted into a digital signal.

Since the voltage range of the pixel signal PXS when the analog gain is not“ ” is smaller than that when the analog gain is“ ”, the ADC 700 may perform analog-to-digital conversion using one ramp signal RMP0_X16B. In this case, since the buffer 722 is in the off state, the power which is consumed by the buffer 722 may decrease.

Although it has been described above that the inclinations of the ramp signals RMP0_X16B and RMP1_X16B and the inclinations of the ramp signals RMP0_X16A and RMP1_X16A are the same as each other, the inclinations of the ramp signals RMP0_X16B and RMP1_X16B may be different from the inclinations of the ramp signals RMP0_X16A and RMP1_X16A. For example, the inclinations of the ramp signals RMP0_X16B and RMP1_X16B may be two times the inclinations of the ramp signals RMP0_X16A and RMP1_X16A.

Figure 9:
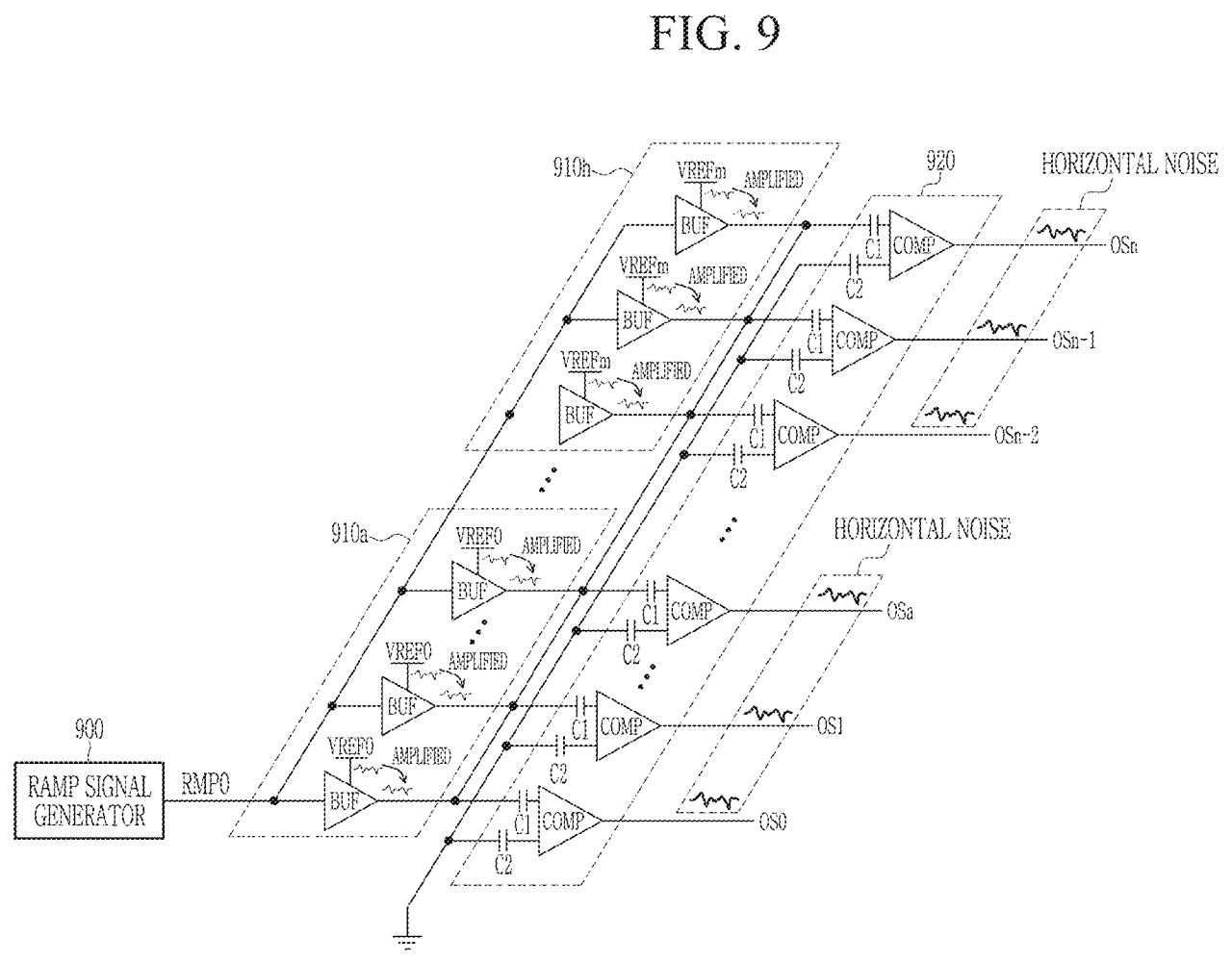
Figure 10:
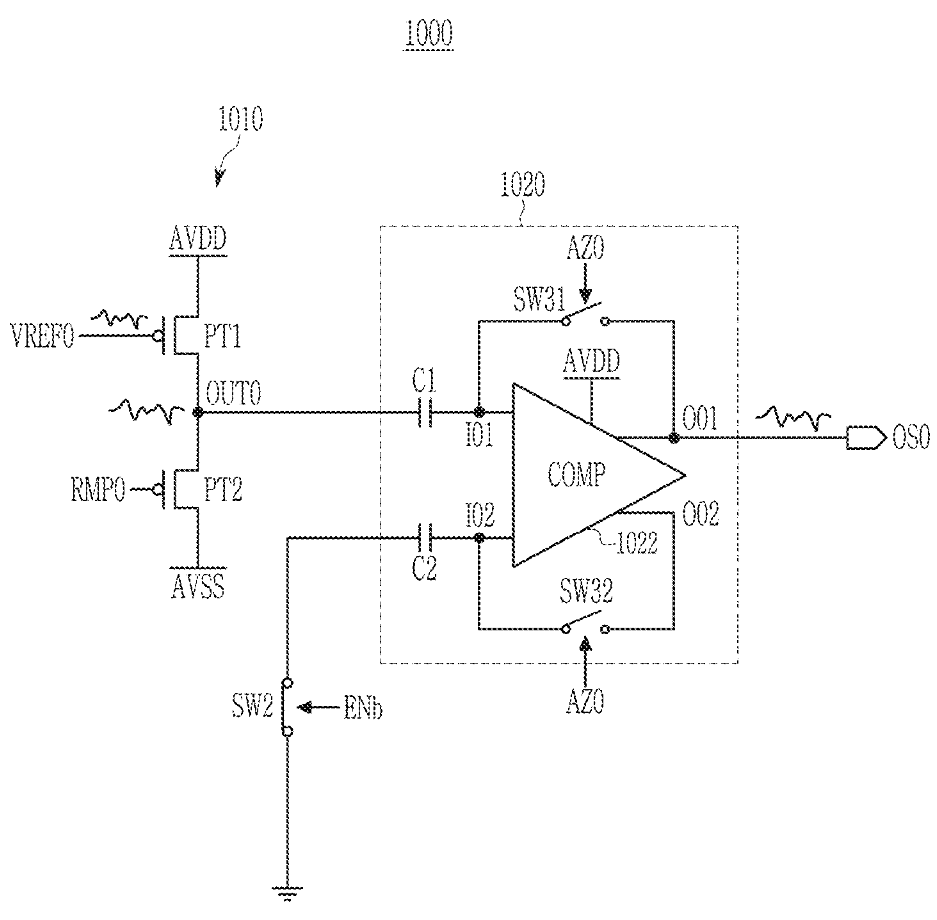
FIG. 10 is a circuit diagram illustrating a buffer and a comparator in the ADC of FIG. 9.

FIG. 9 is a block diagram illustrating a case where an ADC of an image sensor according to some example embodiments outputs signals containing noise, and FIG. 10 is a circuit diagram illustrating a buffer and a comparator in the ADC of FIG. 9.

Referring to FIG. 9, when the ADC operates in the second mode, a ramp signal generator 900 may provide a ramp signal RMP0 to a plurality of buffer groups 910*a*, through 910*h*. The plurality of buffer groups 910*a*, through 910*h* may buffer the ramp signal RMP0 and provide it to a comparator circuit 920. Each of the plurality of buffer groups 910*a*, through 910*h* may include a plurality of buffers BUF. The comparator circuit 920 may include a plurality of comparators COMP. In some embodiments, the plurality of comparators COMP may be connected to the plurality of buffers BUF through capacitors C1, respectively.

Output terminals of the plurality of buffer groups 910*a*, through 910*h* may be connected to one another. Accordingly, since flicker noise of all buffers BUF included in the plurality of buffer groups 910*a*, through 910*h* are orthogonal, they may be cancelled out by one another.

The plurality of buffer groups 910*a*, through 910*h* may receive the same bias signals VREF0, through VREFm, respectively. For example, a plurality of buffers BUF included in one buffer group 910*a* may receive the same bias signal VREF0. The plurality of buffers BUF included in one buffer group 910*a* may be biased on the basis of the same bias signal VREF0. Noise included in the bias signal VREF0 may be amplified in each of the plurality of buffers BUF. The amplified noise may be transferred to first input terminals of the comparators COMP.

Referring to FIG. 10 together, an ADC 1000 may include a buffer 1010 and a comparison circuit 1020.

The buffer 1010 may be a source follower including a plurality of transistors PT1 and PT2 connected in series between driving voltages AVDD and AVSS. The buffer 1010 may be biased through the transistor PT1. To the gate of the transistor PT1, the bias signal VREF0 may be applied. To the gate of the transistor PT2, a ramp signal RMP0 may be applied.

The output terminal OUT0 of the buffer 1010 may be connected to a first input terminal IO1 of a comparator 1022 through a capacitor C1. A reference voltage may be provided to a second input terminal IO2 of the comparator 1022 through a switch SW2 and a capacitor C2. The comparator 1022 may generate an output signal OS0 based on the difference between the synthesis signal of the ramp signal RMP0 and a pixel signal applied to the first input terminal IO1 and the reference voltage applied to the second input terminal IO2. The output signal OS0 which is output to an output terminal O01 may include noise.

For example, when the pixels PX exposed to lower luminance are suddenly exposed to higher luminance, the pixel signals PXS may be rapidly changed. The rapid change of the pixel signals PXS may generate noise in the plurality of bias signals VREF0 through VREFm. These noise may be amplified by the plurality of buffers BUF, and be output to the output terminals of the plurality of buffer groups 910*a* through 910*h*. When it is assumed that the noise included in the plurality of bias signals VREF0 through VREFm have the degree of correlation of 0 and are orthogonal to one another, the noise in the signals which are output from the output terminals of the plurality of buffer groups 910*a* through 910*h* may decrease as the number of the plurality of bias signals VREF0 through VREFm increases. The number of the plurality of bias signals VREF0 through VREFm (for example, 10) may be much smaller than the number of all buffers BUF included in the plurality of buffer groups 910*a* through 910*h* (for example, 8000). Accordingly, it is difficult for the amplified signals of the noise included in the plurality of bias signals VREF0 through and VREFm to be cancelled out by one another at the output terminals of the plurality of buffer groups 910*a* through 910*h*. Therefore, output signals SO0, OS1, through oSa, oSn−2, oSn−1, and oSn may include noise (horizontal noise) due to the noise included in the plurality of bias signals VREF0, through VREFm.

Figure 11:
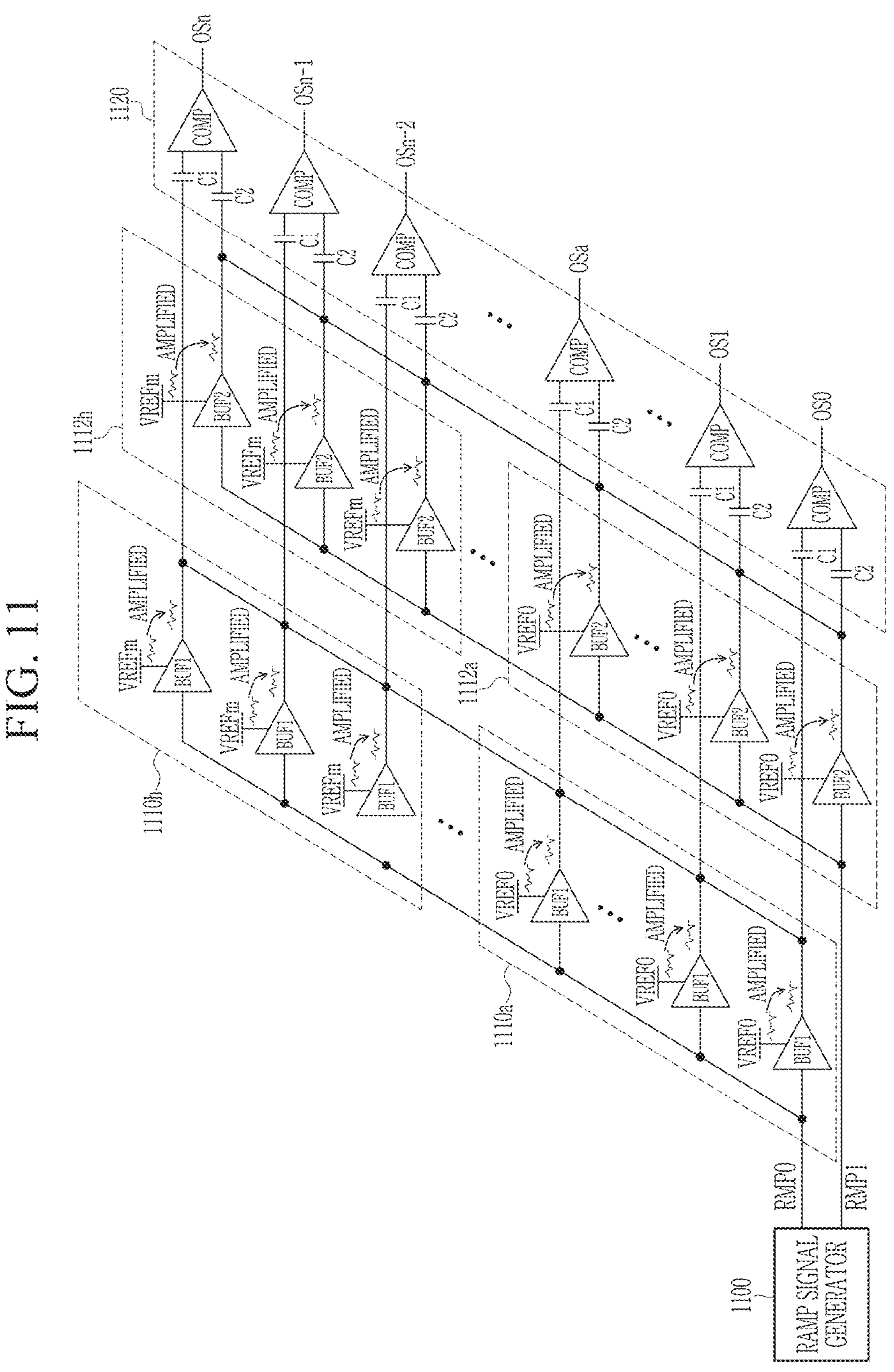
FIG. 11 is a block diagram illustrating a case where an ADC of an image sensor according to some example embodiments outputs signals with noise canceled out.
Figure 12:
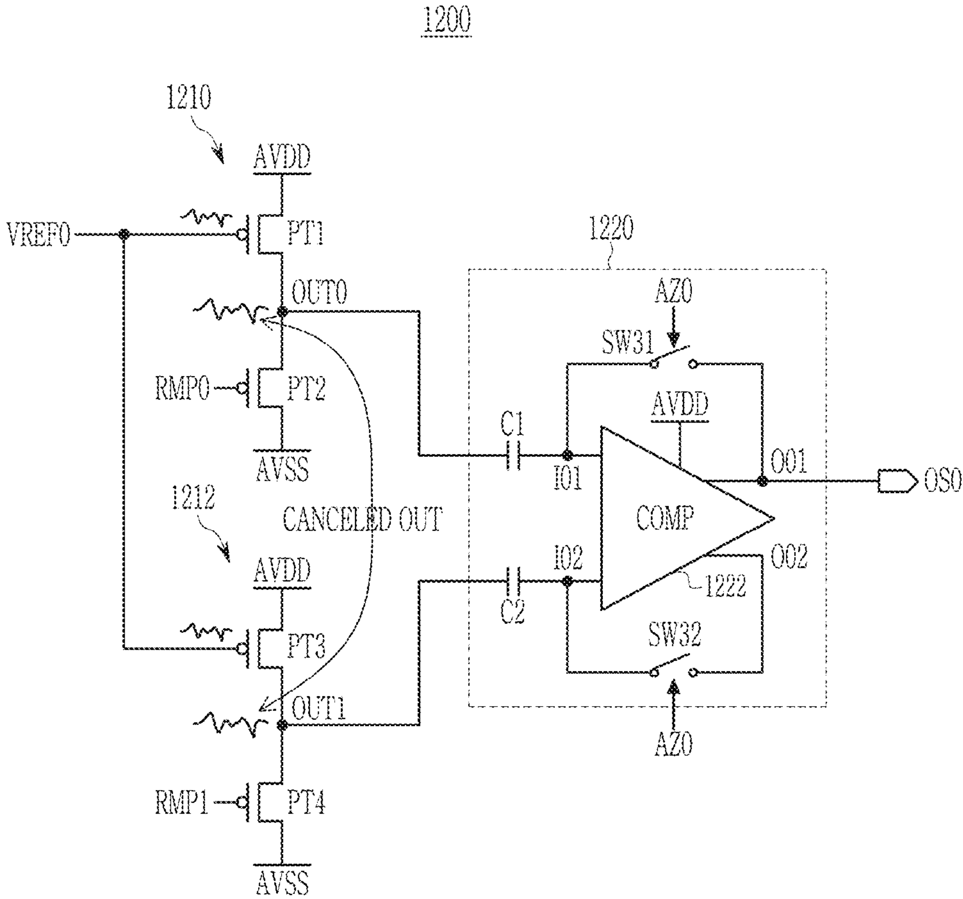
FIG. 12 is a circuit diagram illustrating a buffer and a comparator in the ADC of FIG. 11.

FIG. 11 is a block diagram illustrating a case where an ADC of an image sensor according to some example embodiments outputs signals with noise canceled out, and FIG. 12 is a circuit diagram illustrating a buffer and a comparator in the ADC of FIG. 11.

Referring to FIG. 11, when the ADC operates in the first mode, a ramp signal generator 1100 may provide a ramp signal RMP0 to a plurality of first buffer groups 1110*a* through 1100*h* and may provide a ramp signal RMP1 to a plurality of second buffer groups 1112*a* through 1112*h*. The numbers of the plurality of first buffer groups 1110*a* through 1110*h* and the plurality of second buffer groups 1112*a* through 1112*h* may be equal to or different from each other. The plurality of first buffer groups 1110*a* through 1110*h* may buffer the ramp signal RMP0 and provide it to a comparator circuit 1120. Each of the plurality of first buffer groups 1110*a* through 1110*h* may include a plurality of first buffers BUF1. The plurality of second buffer groups 1112*a* through 1112*h* may buffer the ramp signal RMP1 and provide it to the comparator circuit 1120. Each of the plurality of second buffer groups 1112*a* through 1112*h* may include a plurality of second buffers BUF2.

The comparator circuit 1120 may include a plurality of comparators COMP. In some embodiments, the plurality of comparators COMP may be connected to the plurality of first buffers BUF1 through capacitors C1, respectively, and be connected to the plurality of second buffers BUF2 through capacitors C2.

The output terminals of the plurality of first buffer groups 1110*a* through 1110*h* may be connected to one another. Accordingly, since flicker noise of all first buffers BUF1 included in the plurality of first buffer groups 1110*a* through 1110*h* are orthogonal, they may be cancelled out by one another. Similarly, the output terminals of the plurality of second buffer groups 1112*a* through 1112*h* may be connected to one another. Accordingly, since flicker noise of all second buffers BUF2 included in the plurality of second buffer groups 1112*a* through 1112*h* are orthogonal, the flicker noise may be cancelled out by one another.

The plurality of first buffer groups 1110*a* through 1110*h* may receive the same bias signals VREF0 through VREFm, respectively. The plurality of second buffer groups 1112*a* through 1112*h* may receive the same bias signals VREF0 through VREFm, respectively. For example, the plurality of first buffers BUF1 included in one buffer group 1110*a* may receive the same bias signal VREF0. The plurality of first buffers BUF1 included in one buffer group 1110*a* may be biased on the basis of the same bias signal VREF0. In some embodiments, the first buffer group 1110*a* and the second buffer group 1112*a* corresponding to each other may receive the same bias signal VREF0. For example, a first buffer BUF1 and a second buffer BUF2 which buffer the ramp signal RMP0 and the ramp signal RMP1, respectively, and provide them to the first input terminal and second input terminal of the same comparator COMP may receive the same bias signal VREF0.

Noise included in the bias signal VREF0 may be amplified in each of the plurality of first buffers BUF1 and the plurality of second buffers BUF2. The amplified noise may be transferred to the first input terminals and second input terminals of the comparators COMP.

Referring to FIG. 12 together, an ADC 1200 may include a first buffer 1210, a second buffer 1212, and a comparison circuit 1220.

The first buffer 1210 may be a source follower including a plurality of transistors PT1 and PT2 connected in series between driving voltages AVDD and AVSS. The buffer 1210 may be biased through the transistor PT1. To the gate of the transistor PT1, the bias signal VREF0 may be applied. To the gate of the transistor PT2, a ramp signal RMP0 may be applied.

The second buffer 1212 may be a source follower including a plurality of transistors PT3 and PT4 connected in series between the driving voltages AVDD and AVSS. The buffer 1212 may be biased through the transistor PT3. To the gate of the transistor PT3, the bias signal VREF0 may be applied. To the gate of the transistor PT4, a ramp signal RMP1 may be applied.

The output terminal OUT0 of the first buffer 1210 may be connected to a first input terminal IO1 of a comparator 1222 through a capacitor C1. The output terminal OUT1 of the second buffer 1212 may be connected to a second input terminal IO2 of the comparator 1222 through a capacitor C2.

The comparator 1222 may generate an output signal OS0 based on the difference between the synthesis signal of the ramp signal RMP0 and a pixel signal applied to the first input terminal IO1 and the ramp signal RMP1 applied to the second input terminal IO2.

Since the ramp signals RMP0 and RMP1 including noise based on the same bias signal VREF0 are differentiated by the comparator 1222, an output signal OS0 with noise cancelled out may be output to an output terminal O01.

Accordingly, when the ADC 1200 operates in the first mode it is possible to reduce noise (horizontal noise).

Figure 13:
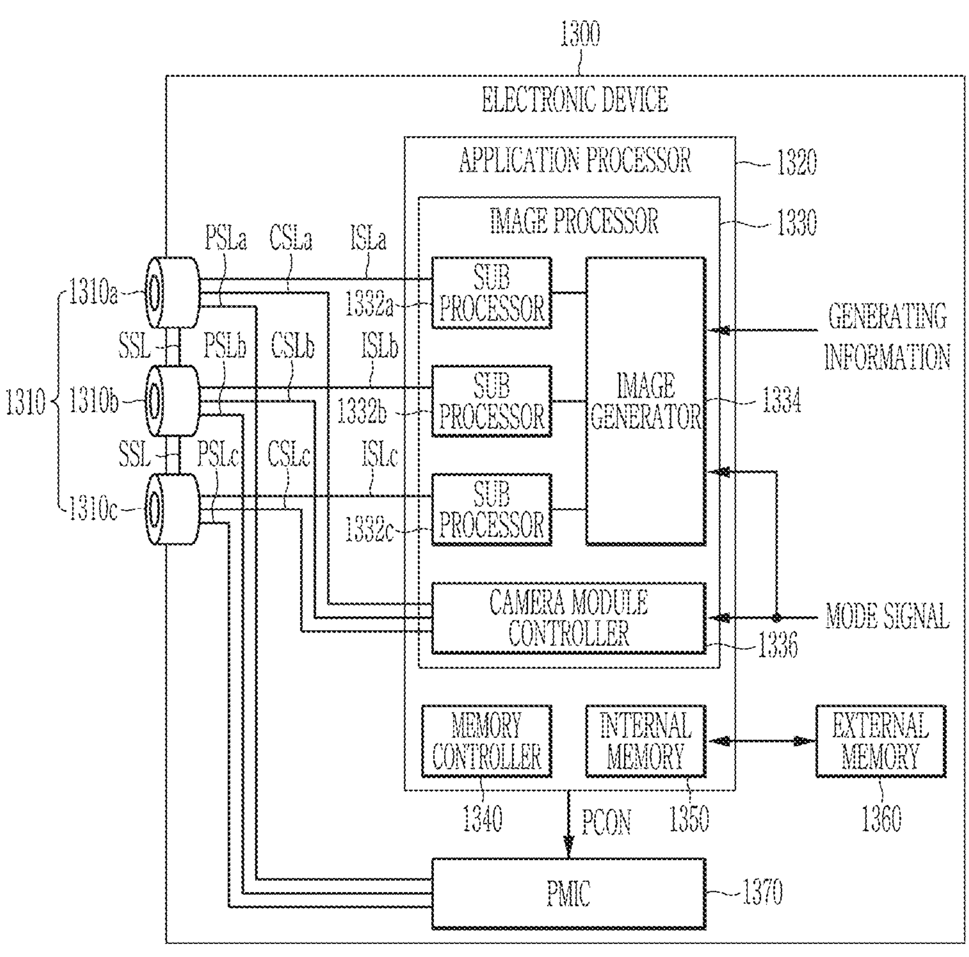
FIG. 13 is a block diagram of an electronic device having a multi-camera module including an image sensor according to some example embodiments.
Figure 14:
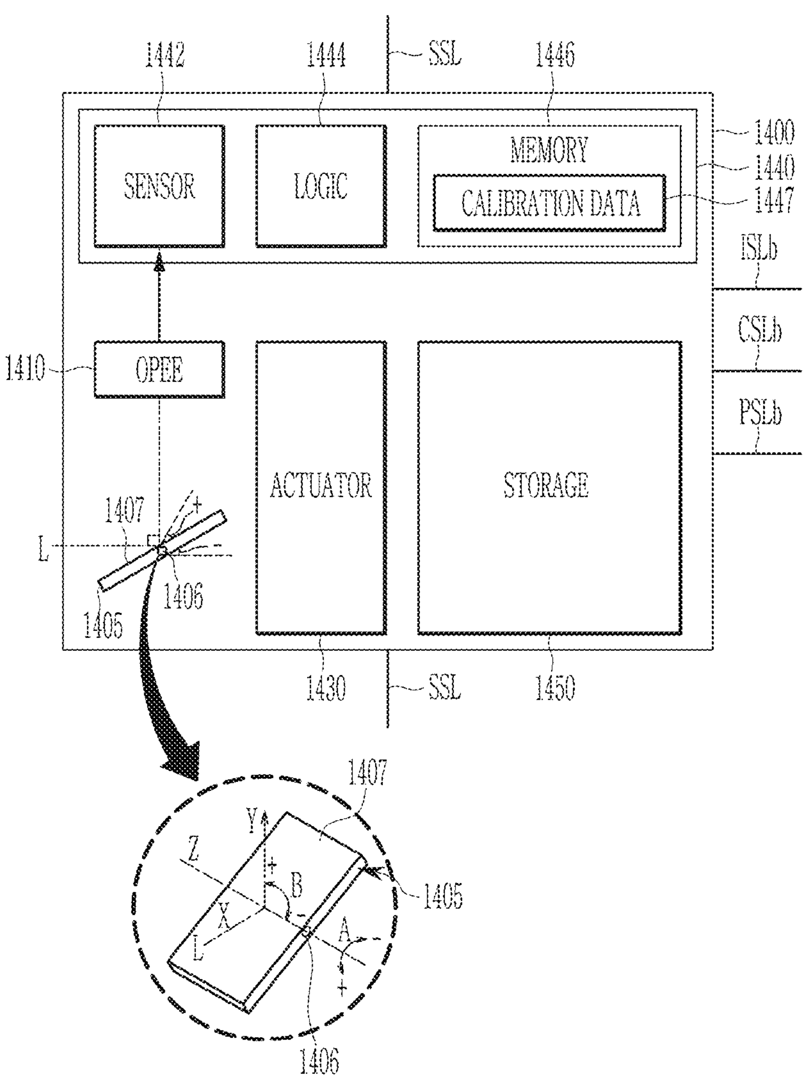
FIG. 14 is a block diagram illustrating a camera module of FIG. 13 in detail.

FIG. 13 is a block diagram of an electronic device having a multi-camera module including an image sensor according to some example embodiments, and FIG. 14 is a block diagram illustrating a camera module of FIG. 13 in detail.

Referring to FIG. 13, an electronic device 1300 may include a camera module group 1310, an application processor 1320, a power management integrated circuit (PMIC) 1370, and an external memory 1360.

The camera module group 1310 may include a plurality of camera modules 1310*a*, 1310*b*, and 1310*c*. Although some example embodiments in which three camera modules 1310*a*, 1310*b*, and 1310*c* are arranged is shown in the drawing, embodiments are not limited thereto. In some embodiments, the camera module group 1310 may be modified to include only two camera modules. Also, in some embodiments, the camera module group 1310 may be modified to include n number of camera modules (wherein n is a natural number equal to or greater than 4).

Hereinafter, the detailed configuration of the camera module 1310*b* will be described in more detail with reference to FIG. 14; however, the following description may be equally applied to the other camera modules 1310*a* and 1310*c*, depending on embodiments.

Referring to FIG. 14, a camera module 1400 may include a prism 1405, an optical path folding element (hereinafter, referred to as ""OPF"") 1410, an actuator 1430, an image sensing device 1440, and a storage unit 1450.

The prism 1405 may include a reflective surface 1407 of a light-reflective material to change the path of light L entering from the outside.

In some embodiments, the prism 1405 may change the path of light L entering in a first direction X to a second direction Y perpendicular to the first direction X. Also, the prism 1405 may be configured to rotate the reflective surface 1407 of the light-reflective material on a central axis 1406 in an A direction or rotate the central axis 1406 in a B direction to change the path of light L entering in the first direction X to the second direction Y. At this time, the OPFE 1410 may also move a third direction Z perpendicular to the first direction X and the second direction Y.

In some embodiments, the maximum rotation angle of the prism 1405 in the plus A direction may be equal to or smaller than 15 degrees and the maximum rotation angle of the prism in the minus A direction may be larger than 15 degrees; however, embodiments are not limited thereto.

In some embodiments, the prism 1405 may move in the plus or minus B direction by about 20 degrees, or between 10 degrees and 20 degrees, or between 15 degrees and 20 degrees, wherein the angle by which the prism can move in the plus B direction may be equal to the angle by which the prism can move in the minus B direction, or differ by about 1 degree from the angle by which the prism can move in the minus B direction.

In some embodiments, the prism 1405 may move the reflective surface 1407 of the light-reflective material in the third direction (for example, the Z direction) parallel with the extension direction of the central axis 1406.

The OPFE 1410 may include an optical lens consisting of m number of groups (wherein m is a natural number). m number of lenses may move in the second direction Y to change the optical zoom ratio of the camera module 1310*b*. For example, when the default optical zoom ratio of the camera module 1310*b* is Z, the m number of optical lenses included in the OPFE 1410 may be moved to change the optical zoom ratio of the camera module 1310*b* to an optical zoom ratio of 3Z, or 5Z, or more than 5Z. The OPFE 1410 may further include an optical lens consisting of p number of groups (wherein p is a natural number) in front of the above-mentioned m number of lenses.

The actuator 1430 may move the OPFE 1410 and/or an optical lens (hereinafter, referred to as an optical lens) to a specific position. For example, the actuator 1430 may adjust the position of the optical lens such that an image sensor 1442 is positioned at the focal length of the optical lens for accurate sensing.

The image sensing device 1440 may include the image sensor 1442, a control logic 1444, and a memory 1446. The image sensor 1442 may sense an image of the subject of sensing, using light L which is provided through the optical lens. In some embodiments, an ADC circuit of the image sensor 1442 may convert pixel signals into digital signals, using a first ramp signal which increases with a predetermined inclination and a second ramp signal that decreases with a predetermined inclination. The ADC circuit may generate digital signals based on signals obtained by comparing the synthesis signals of the pixel signals and the first ramp signal and the second ramp signal. The ADC circuit may generate digital signals based on signals obtained by comparing the synthesis signals of the pixel signals and the first ramp signal and the second ramp signal or signals obtained by comparing the synthesis signals of the pixel signals and the first ramp signal and a reference signal having a predetermined voltage level, depending on the operation modes. The image sensor 1442 may provide higher-quality image data by removing noise which might have been generated in buffers transmitting the ramp signals, and reduce the power consumption by driving circuits (a ramp signal generator, buffers, and comparators) in the ADC at lower driving voltages. The control logic 1444 may control the overall operation of the camera module 1400. For example, the control logic 1444 may control the operation of the camera module 1400 according to a control signal provided through a control signal line CSLb.

The memory 1446 may store information necessary for the operation of the camera module 1400, such as calibration data 1447. The calibration data 1447 may include information necessary for the camera module 1400 to generate image data using light L provided from the outside. The calibration data 1447 may include, for example, information on the degrees of rotation described above, information on the focal length, information on an optical axis, and the like. When the camera module 1400 is implemented in the form of a multi-state camera in which the focal length varies depending on the position of an optical lens, the calibration data 1447 may include the focal length value according to each position (or state) of the optical lens, and information related to auto focusing.

The storage unit 1450 may store image data sensed through the image sensor 1442. The storage unit 1450 may be disposed outside the image sensing device 1440, and may be implemented in a form in which the storage unit and a sensor chip constituting the image sensing device 1440 are stacked. In some embodiments, the storage unit 1450 may be implemented as an electrically erasable programmable read-only memory (EEPROM); however, embodiments are not limited thereto.

Referring to FIGS. 13 and 14 together, in some embodiments, each of the plurality of camera modules 1310*a*, 1310*b*, and 1310*c* may each include an actuator 1430. Accordingly, the plurality of camera modules 1310*a*, 1310*b*, and 1310*c* may include the same or different calibration data 1447 according to the operations of the actuators 1430 included in them.

In some embodiments, one camera module (for example, 1310*b*) of the plurality of camera modules 1310*a*, 1310*b*, and 1310*c* may be a folded lens type of camera module including the prism 1405 and the OPFE 1410 described above, and the other camera modules (for example, 1310*a* and 1310*c*) may be a vertical type of camera modules which do not include the prism 1405 and the OPFE 1410; however, embodiments are not limited thereto.

In some embodiments, one camera module (for example, 1310*c*) of the plurality of camera modules 1310*a*, 1310*b*, and 1310*c* may be a vertical type of depth camera for extracting depth information using, for example, an infrared ray. In this case, the application processor 1320 may generate a 3D depth image by merging image data provided from the depth camera and image data provided from another camera module (for example, 1310*a* or 1310*b*).

In some embodiments, at least two camera modules (for example, 1310*a* and 1310*b*) of the plurality of camera modules 1310*a*, 1310*b*, and 1310*c* may have fields of view (view angles) different from each other. In this case, for example, the optical lenses of at least two camera modules (for example, 1310*a* and 1310*b*) of the plurality of camera modules 1310*a*, 1310*b*, and 1310*c* may be different from each other, but are not limited thereto.

Also, in some embodiments, the view angles of the plurality of camera modules 1310*a*, 1310*b*, and 1310*c* may be different from one another. In this case, the optical lenses, included in the plurality of camera modules 1310*a*, 1310*b*, and 1310*c*, respectively, may also be different from one another, but are not limited thereto.

In some embodiments, the plurality of camera modules 1310*a*, 1310*b*, and 1310*c* may be arranged so as to be physically separate from one another. In other words, the sensing area of one image sensor 1442 is not divided to be used by the plurality of camera modules 1310*a*, 1310*b*, and 1310*c*, but independent image sensors 1442 may be disposed in the plurality of camera modules 1310*a*, 1310*b*, and 1310*c*, respectively.

Referring to FIG. 13 again, the application processor 1320 may include an image processing device 1330, a memory controller 1340, and an internal memory 1350. The application processor 1320 may be implemented separately from the plurality of camera modules 1310*a*, 1310*b*, and 1310*c*. For example, the application processor 1320 and the plurality of camera modules 1310*a*, 1310*b*, and 1310*c* may be implemented as separate semiconductor chips so as to be separate from each other.

The image processing device 1330 may include a plurality of sub image processors 1332*a*, 1332*b*, and 1332*c*, an image generator 1334, and a camera module controller 1336.

The image processing device 1330 may include the plurality of sub image processors 1332*a*, 1332*b*, and 1332*c*, the number of which corresponds to the number of the plurality of camera modules 1310*a*, 1310*b*, and 1310*c*.

Image data generated from the individual camera modules 1310*a*, 1310*b*, and 1310*c* may be provided to the corresponding sub image processors 1332*a*, 1332*b*, and 1332*c* through image signal lines ISLa, ISLb, and ISLc separated from one another. For example, the image data generated from the camera module 1310*a* may be provided to the sub image processor 1332*a* through the image signal line ISLa, and the image data generated from the camera module 1310*b* may be provided to the sub image processor 1332*b* through the image signal line ISLb, and the image data generated from the camera module 1310*c* may be provided to the sub image processor 1332*c* through the image signal line ISLc. These image data transfers may be performed using, for example, camera serial interfaces (CSIs) based on mobile industry processor interfaces (MIPIs); however, embodiments are not limited thereto.

The image data provided to the individual sub image processors 1332*a*, 1332*b*, and 1332*c* may be provided to the image generator 1334. The image generator 1334 may generate an output image using the image data provided from the individual sub image processors 1332*a*, 1332*b*, and 1332*c* according to image generating information or a mode signal.

Specifically, the image generator 1334 may generate an output image by merging at least some of the image data generated from the camera modules 1310*a*, 1310*b*, and

1310*c* having view angles different from one another, according to image generating information or a mode signal. Also, the image generator 1334 may generate an output image by selecting one of the image data generated from the camera modules 1310*a*, 1310*b*, and 1310*c* having view angles different from one another, according to image generating information or a mode signal.

The camera module controller 1336 may provide control signals to the individual camera modules 1310*a*, 1310*b*, and 1310*c*. Control signals generated from the camera module controller 1336 may be provided to the corresponding camera modules 1310*a*, 1310*b*, and 1310*c* through control signal lines CSLa, CSLb, and CSLc separated from one another.

The application processor 1320 may store a received image signal, that is, an encoded image signal, in the memory 1350 provided therein or a storage 1360 provided outside the application processor 1320, and thereafter, may read the encoded image signal from the memory 1350 or the storage 1360 and decode it and display image data generated based on the decoded image signal. For example, a corresponding sub image processor of the plurality of sub image processors 1332*a*, 1332*b*, and 1332*c* of the image processing device 1320 may perform the decoding, and may also perform image processing on the decoded image signal.

The PMIC 1370 may supply power, for example, a power voltage to each of the plurality of camera modules 1310*a*, 1310*b*, and 1310*c*. For example, the PMIC 1370 may supply first power to the camera module 1310*a* through a power signal line PSLa, supply second power to the camera module 1310*b* through a power signal line PSLb, and supply third power to the camera module 1310*c* through a power signal line PSLc, under the control of the application processor 1320.

In some embodiments, each of the components described with reference to FIG. 1 to FIG. 14, or a combination of two or more components may be implemented as a digital circuit, a programmable or non-programmable logic device or array, an application specific integrated circuit (ASIC), etc.

As described herein, any functional components, electronic devices, and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and/or the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof. Additionally, any and/or all of the devices, systems, modules, units, controllers, circuits, architectures, and/or portions thereof may include active and/or passive electrical components such as transistors, resistors, capacitors and/or electronic circuits including one or more of said components.

While these inventions have been described in connection with what is presently considered to be practical example embodiments, it is to be understood that the inventions are not limited to the disclosed embodiments. On the contrary, it is intended to cover various modifications and equivalent arrangements included within the spirit and scope of the appended claims.

What is claimed is:

1. An analog-to-digital converter circuit comprising:

a ramp signal generator configured to generate a first ramp signal configured to rise with a first inclination and a second ramp signal configured to fall with a second inclination; and a comparison circuit configured to generate a synthesis signal comprising the first ramp signal and a pixel signal output from a pixel array, and output a comparison result based on a comparison between the synthesis signal and the second ramp signal.

2. The analog-to-digital converter circuit of claim 1, further comprising:

a first buffer configured to buffer the first ramp signal and to transmit the buffered first ramp signal to the comparison circuit; and a second buffer configured to buffer the second ramp signal and to transmit the buffered second ramp signal to the comparison circuit.

3. The analog-to-digital converter circuit of claim 2, wherein:

the first buffer and the second buffer are configured to receive the same driving voltage.

4. The analog-to-digital converter circuit of claim 3, wherein:

the second buffer is configured to be turned on in a first mode, and to be turned off in a second mode different from the first mode.

5. The analog-to-digital converter circuit of claim 4, further comprising:

a switch configured to be opened in the first mode and be closed in the second mode and to apply a reference voltage having a constant level to the comparison circuit during the second mode.

6. The analog-to-digital converter circuit of claim 4, wherein:

the first inclination is the same in the first mode and the second mode.

7. The analog-to-digital converter circuit of claim 4, wherein:

the first inclination in the second mode is twice the first inclination in the first mode.

8. The analog-to-digital converter circuit of claim 2, wherein the ramp signal generator includes:

a plurality of ramp current generators including a plurality of ramp current sources, a plurality of first switches configured to connect the plurality of ramp current sources to a first node when closed, and a plurality of second switches configured to connect the plurality of ramp current sources to a second node when closed;

a first ramp resistor connected to the first node; and a second ramp resistor connected to the second node.

9. The analog-to-digital converter circuit of claim 8, wherein:

one of the plurality of first switches and at least one corresponding second switch of the plurality of second switches are configured to operate complementarily.

10. The analog-to-digital converter circuit of claim 8, wherein:

the ramp signal generator is further configured to output the first ramp signal through the first node, and to output the second ramp signal through the second node.

11. The analog-to-digital converter circuit of claim 1, wherein:

the first inclination and the second inclination are the same.

12. An image sensor comprising:

a pixel array including a plurality of pixels, the pixel array configured to output a pixel signal;

a ramp signal generator configured to generate a first ramp signal configured to rise with a first inclination and a second ramp signal configured to fall with a second inclination; and an analog-to-digital conversion circuit configured to output a digital signal based on a comparison result between a synthesis signal and the second ramp signal, wherein the synthesis signal comprises the first ramp signal and a pixel signal output from the pixel array.

13. The image sensor of claim 12, wherein the analog-to-digital conversion circuit is configured to output the digital signal based on the comparison result between the synthesis signal and the second ramp signal in a first mode, and the analog-to-digital conversion circuit is further configured to, in a second mode, receive a reference voltage having a constant level and to output the pixel signal as the digital signal based on a comparison result between the synthesis signal and the reference voltage.

14. The image sensor of claim 13, wherein:

based on an analog gain of the analog-to-digital conversion circuit being a first value, the analog-to-digital conversion circuit is configured to operate in the first mode, and based on the analog gain of the analog-to-digital conversion circuit being a second value, the analog-to-digital conversion circuit is further configured to operate in at least one of the first mode or the second mode.

15. The image sensor of claim 14, wherein:

the first inclination, when the analog gain of the analog-to-digital conversion circuit is the second value and the analog-to-digital conversion circuit operates in the first mode, is the same as the first inclination when the analog gain of the analog-to-digital conversion circuit is the second value and the analog-to-digital conversion circuit operates in the second mode.

16. The image sensor of claim 15, wherein the analog-to-digital conversion circuit includes:

a plurality of first buffer groups configured to receive the first ramp signal and to output a plurality of buffered first ramp signals; and a comparator circuit including a plurality of comparators configured to receive the plurality of buffered first ramp signals from the plurality of first buffer groups.

17. The image sensor of claim 16, wherein:

the analog-to-digital conversion circuit further includes a plurality of second buffer groups configured to receive the second ramp signal and to output a plurality of buffered second ramp signals, the comparators are further configured to receive the plurality of buffered second ramp signals from the plurality of second buffer groups, the plurality of first buffer groups and the plurality of second buffer groups are configured to bias the plurality of first buffer groups and the plurality of second buffer groups based on a plurality of bias signals, and at least one of the plurality of first buffer groups and at least one corresponding second buffer of the plurality of second buffer groups is further configured to be biased by the same bias signal of the plurality of bias signals.

18. The image sensor of claim 17, wherein:

each of the plurality of first buffer groups includes a plurality of first buffers, each of the plurality of second buffer groups includes a plurality of second buffers, and the ramp signal generator, the plurality of first buffers, the plurality of second buffers, and the plurality of comparators are further configured to receive the same driving voltage.

19. The image sensor of claim 17, wherein:

the second buffer groups are further configured to be turned on in the first mode, and to be turned off in the second mode different from the first mode.

20. An operating method of an image sensor, the method comprising:

outputting a first ramp signal configured to rise with a first inclination and a second ramp signal configured to fall with a second inclination;

converting a pixel signal at a reset level into a first digital signal based on a synthesis signal and the second ramp signal, wherein the synthesis signal comprises the first ramp signal and the pixel signal;

converting the pixel signal at the reset level into a second digital signal based on the synthesis signal and the second ramp signal; and generating image data based on the first digital signal and the second digital signal.

* * * * *